US010883852B1

(12) United States Patent
Ludington et al.

(10) Patent No.: US 10,883,852 B1
(45) Date of Patent: Jan. 5, 2021

(54) SIMULATING INERTIAL MOTION USING TRUE INERTIAL MOTION

(71) Applicant: Amazon Technologies, Inc., Seattle, WA (US)

(72) Inventors: Ben Thompson Ludington, Sammamish, WA (US); Carlos Guillermo Parodi, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 346 days.

(21) Appl. No.: 15/881,606

(22) Filed: Jan. 26, 2018

(51) Int. Cl.
*G01C 25/00* (2006.01)
*G01C 19/5783* (2012.01)
*G01C 23/00* (2006.01)
*B64F 5/60* (2017.01)
*G01P 15/08* (2006.01)
*G01P 21/00* (2006.01)
*G01P 15/18* (2013.01)

(52) U.S. Cl.
CPC ............. *G01C 25/00* (2013.01); *B64F 5/60* (2017.01); *G01C 19/5783* (2013.01); *G01C 23/00* (2013.01); *G01P 15/0802* (2013.01); *G01P 15/18* (2013.01); *G01P 21/00* (2013.01)

(58) Field of Classification Search
CPC .... G01C 25/00; G01C 23/00; G01C 19/5783; G01P 21/00; G01P 15/0802; G01P 15/18; B64F 5/60
USPC .......................................................... 73/1.38
See application file for complete search history.

(56) References Cited

U.S. PATENT DOCUMENTS

| 3,583,205 | A | * | 6/1971 | Erle | ..................... F16C 32/0622 73/1.87 |
| 5,421,187 | A | * | 6/1995 | Morgan | ................. G01C 21/16 73/1.78 |
| 6,196,048 | B1 | * | 3/2001 | Kunimi | .................... G01P 21/00 33/366.12 |
| 6,738,721 | B1 | * | 5/2004 | Drucke | ................ G01C 25/005 702/95 |
| 6,888,073 | B2 | * | 5/2005 | Kawasaki | ................ B64G 1/32 177/1 |
| 8,887,566 | B1 | * | 11/2014 | Tanenhaus | .............. G01P 15/14 73/504.04 |
| 9,970,781 | B2 | * | 5/2018 | Christian | ............... G01C 25/00 |

(Continued)

Primary Examiner — Nathaniel T Woodward
(74) Attorney, Agent, or Firm — Athorus, PLLC

(57) ABSTRACT

Where a body includes one or more inertial motion sensors, such as gyroscopes or accelerometers, the body's response to inertial motion may be simulated by actually imparting inertial motion to the sensors, and interpreting signals received from such sensors in response to the inertial motion. Gyroscopes or accelerometers of an aerial vehicle may be physically removed therefrom and remain in communication with an inertial navigation system, and rotated by one or more motors or motorized components to simulate angular velocities on the gyroscopes or accelerations on the accelerometers. Signals received by the inertial navigation system from the gyroscopes or the accelerometers may be evaluated to confirm the operability of the gyroscopes and accelerometers, the responsiveness of the inertial navigation system to sensed inertial motion or events associated with such inertial motion, or any other aspect of the aerial vehicle.

20 Claims, 19 Drawing Sheets

(56) References Cited

U.S. PATENT DOCUMENTS

| | | | | |
|---|---|---|---|---|
| 2009/0319228 A1* | 12/2009 | Niu | ............... | G01C 25/005 |
| | | | | 702/182 |
| 2009/0326851 A1* | 12/2009 | Tanenhaus | ............ | G01P 3/00 |
| | | | | 702/96 |
| 2014/0306843 A1* | 10/2014 | Merkel | ............ | G01R 29/10 |
| | | | | 342/385 |
| 2019/0368892 A1* | 12/2019 | Cook | ............... | G01P 15/14 |

* cited by examiner

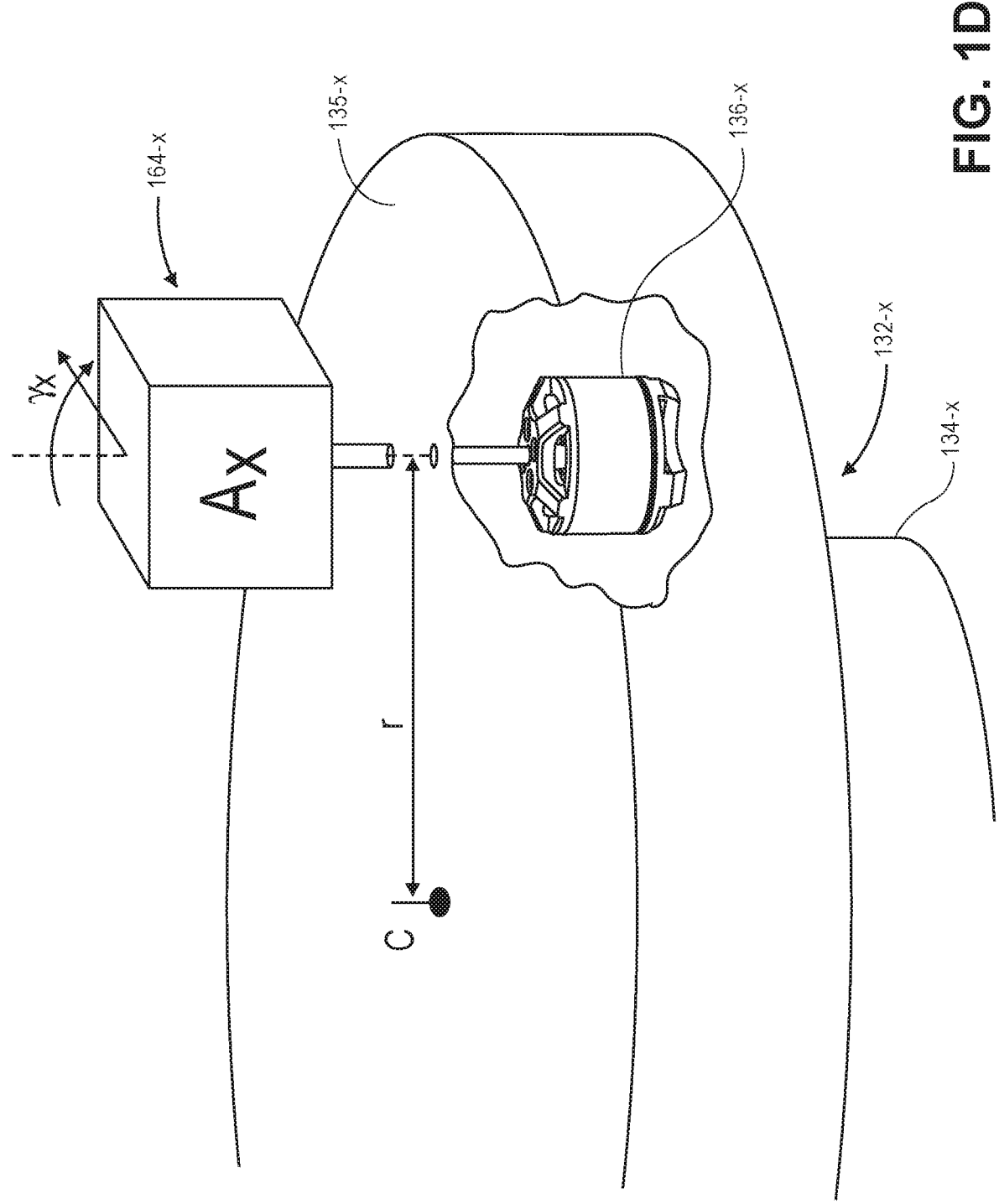

SIMULATING INERTIAL MOTION USING TRUE INERTIAL MOTION

BACKGROUND

The use of unmanned aerial vehicles ("UAV," or drones) such as airplanes or helicopters in a variety of applications (e.g., surveillance, delivery, monitoring, law enforcement, security, mapping, or the like) is increasingly common. Such vehicles may include fixed-wing aircraft, or rotary wing aircraft or other vertical take-off and landing (or VTOL) aircraft having one or more propellers. Many unmanned aerial vehicles are outfitted with inertial measurement units that measure linear and/or angular motion of the unmanned aerial vehicles. Data captured by such inertial measurement units enables an unmanned aerial vehicle to calculate adjustments that may be necessary in order to control the altitude, orientation, course or velocity of the unmanned aerial vehicle. Inertial measurement units are integral parts of navigation systems, e.g., inertial navigation systems, which provide data to control systems for generating control signals for causing the unmanned aerial vehicles to travel or remain on a selected velocity (e.g., course and/or speed), or at a selected altitude or attitude, or for causing the unmanned aerial vehicles to achieve a selected change in velocity, altitude or attitude.

An inertial navigation system acts as a virtual fulcrum to ensure that an unmanned aerial vehicle is properly balanced and oriented during operation. In many unmanned aerial vehicles, when an inertial navigation system senses changes in orientation about one or more of an unmanned aerial vehicle's principal axes, e.g., a normal axis (or yaw axis), a lateral axis (or pitch axis), or a longitudinal axis (or roll axis) of the unmanned aerial vehicle, the inertial navigation system may provide data regarding such changes to a control system, which may issue one or more control signals to cause motors and/or control surfaces to act in response to such changes, and to restore the inertial navigation system to a desired altitude, course or angular orientation, or to effectuate a desired change in altitude, course or angular orientation. Therefore, and as with nearly every aspect of an unmanned aerial vehicle, an inertial navigation system should be subject to initial and/or periodic testing or maintenance in order to ensure that the inertial navigation system is properly detecting and reporting changes in orientation, as a primary concern, and also to ensure that other systems onboard the unmanned aerial vehicle are properly responding to instructions issued by the inertial navigation system, as a secondary concern.

To ensure that an inertial navigation system is operating properly, a trajectory of motion by the inertial navigation system must be simulated. Simulating motion along a given trajectory, however, requires subjecting sensors of the inertial navigation system (e.g., gyroscopes and accelerometers) to the effects of motion along the given trajectory. For a complex system that is subject to large motion events of extended durations, such as an unmanned aerial vehicle, simulating motion of the various sensors of an inertial navigation system, or the responses of the complex system to data captured by such sensors, is a challenging task.

BRIEF DESCRIPTION OF THE DRAWINGS

FIGS. 1A through 1H are views of aspects of one system for simulating inertial motion in accordance with embodiments of the present disclosure.

FIGS. 8A through 8C are views of aspects of one system for simulating inertial motion in accordance with embodiments of the present disclosure.

DETAILED DESCRIPTION

Figure 1A:
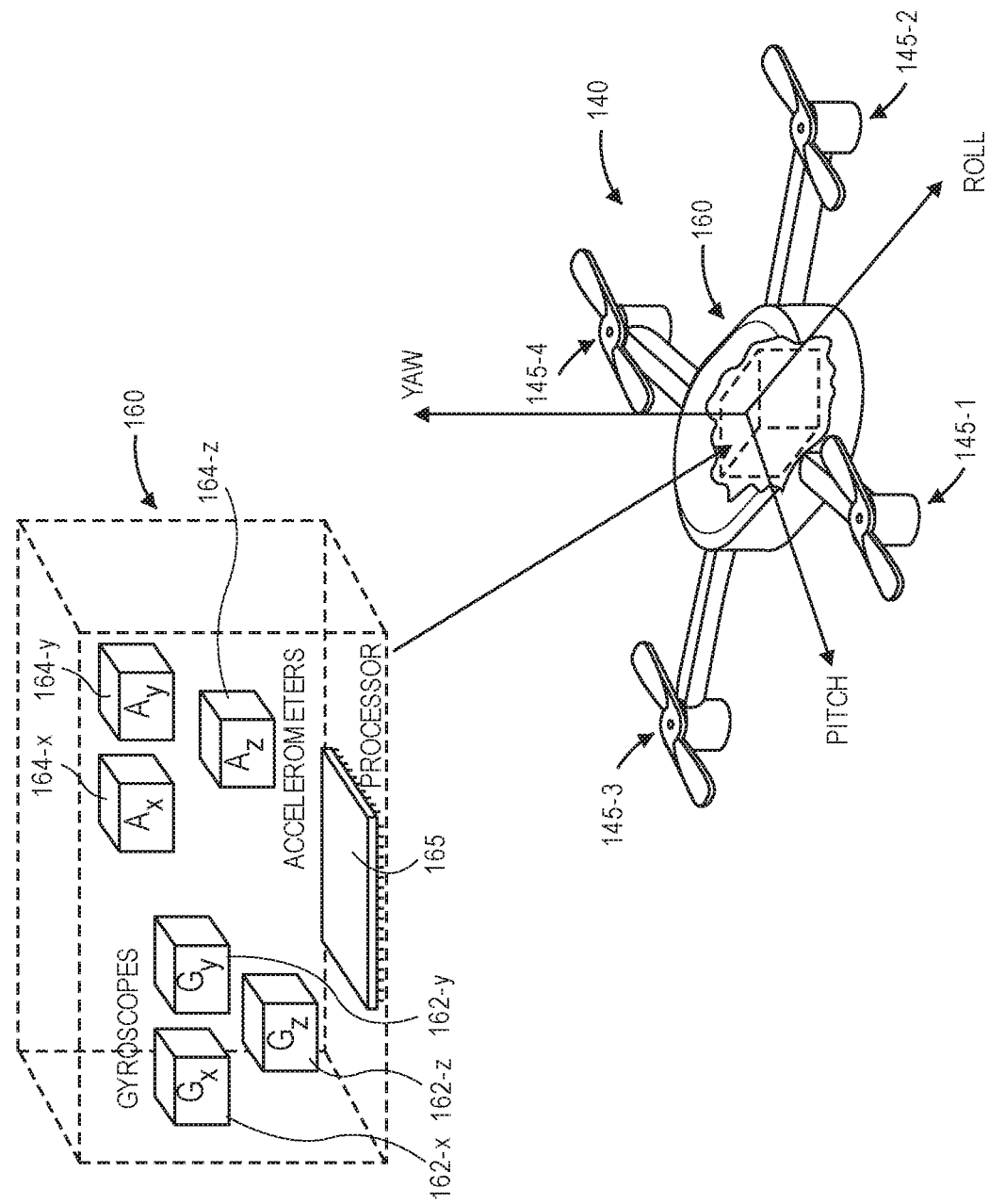

As is set forth in greater detail below, the present disclosure is directed to simulating inertial motion of sensors of an inertial navigation system (or inertial measurement unit) by subjecting such sensors to actual inertial motion by one or more motors or motorized components. More specifically, the present disclosure is directed to imparting desired levels of inertial motion to gyroscopes and/or accelerometers of an inertial navigation system, and receiving signals in response to such inertial motion from the gyroscopes and/or accelerometers. Whether an inertial navigation system, or various components of the system including one or more gyroscopes or accelerometers, are properly functioning may be determined based on the signals received in response to the inertial motion. Furthermore, whether an inertial navigation unit is properly issuing instructions in response to inertial motion, or whether such instructions are being properly followed, may also be determined based on such signals. By mechanically coupling a gyroscope to a motor, and electrically coupling the gyroscope to an inertial navigation system, e.g., by way of a slip ring or other component, actual angular rotation may be directly imparted upon the gyroscope by the rotation of the motor. The gyroscope may generate and return signals corresponding to the sensed angular rotation to the inertial navigation system. By mechanically coupling an accelerometer to a rotatable surface (e.g., a motorized turntable or other device) in an off-center manner, aligning the accelerometer in a selected orientation about a mounting axis that is perpendicular to the rotatable surface and parallel to an axis of rotation of the rotatable surface, and electrically coupling the accelerometer to an inertial navigation system, e.g., by way of a slip ring or other component, acceleration may be directly imparted upon the accelerometer by the rotation of the rotatable surface with the accelerometer in the selected orientation about the mounting axis. The accelerometer may generate and return signals corresponding to the sensed acceleration to the inertial navigation system.

Accordingly, the systems and methods of the present disclosure may simulate the effects of inertial motion acting on a body having an inertial navigation system (or inertial measurement unit), such as an unmanned aerial vehicle, by placing sensors of the inertial navigation system in actual motion, viz., in selected angular rotations or accelerations, and determining the responsiveness of the inertial navigation system to signals generated in response to the actual motion.

Referring to FIGS. 1A through 1H, views of aspects of one system for simulating inertial motion in accordance with embodiments of the present disclosure are shown. The system 100 includes an aerial vehicle 140 having a plurality of propulsion motors 145-1, 145-2, 145-3, 145-4 and an inertial navigation system 160. The aerial vehicle 140 may be any type or form of aircraft, airship or other vehicle that is configured for travel by air, sea or land, at least in part. For example, the aerial vehicle 140 may be intended to transport one or more persons and/or cargo for distances of any length, for any purpose, and may be adapted for manual operation, autonomous operation, or a combination of manual and/or autonomous operation.

The inertial navigation system 160 may be installed within the aerial vehicle 140 and configured to detect changes in linear or rotational motion of the aerial vehicle 140, e.g., by one or more gyroscopes, accelerometers and/or compasses provided therein. For example, the inertial navigation system 160 may be configured to detect changes in linear and/or angular motion along one or more principal axes of the aerial vehicle 140, e.g., an x-axis, or a longitudinal axis (or roll axis) of the aerial vehicle 140, a y-axis, or a normal axis (or yaw axis) of the aerial vehicle 140, and a z-axis, or a lateral axis (or pitch axis) of the aerial vehicle 140.

As is shown in FIG. 1A, the inertial navigation system 160 includes three gyroscopes (or other rotation sensing units) 162-x, 162-y, 162-z and three accelerometers (or other acceleration sensing units) 164-x, 164-y, 164-z and at least one processor 165. The gyroscopes 162-x, 162-y, 162-z and the accelerometers 164-x, 164-y, 164-z may be configured to determine angular velocities and accelerations, respectively, about principal axes of the aerial vehicle 140, viz., x-, y-, and z-axes, or roll, pitch and yaw axes, either as individual sensing structures or as component parts of a common unit, e.g., a three-axis gyroscope or a three-axis accelerometer. In response to sensed angular velocities or accelerations, the gyroscopes 162-x, 162-y, 162-z and the accelerometers 164-x, 164-y, 164-z may return one or more signals to the processors 165, which may generate one or more control signals to be provided to the propulsion motors 145-1, 145-2, 145-3, 145-4, to one or more control surfaces (not shown), or to one or more control systems for operating the propulsion motors 145-1, 145-2, 145-3, 145-4 or such control surfaces.

Figure 1B:
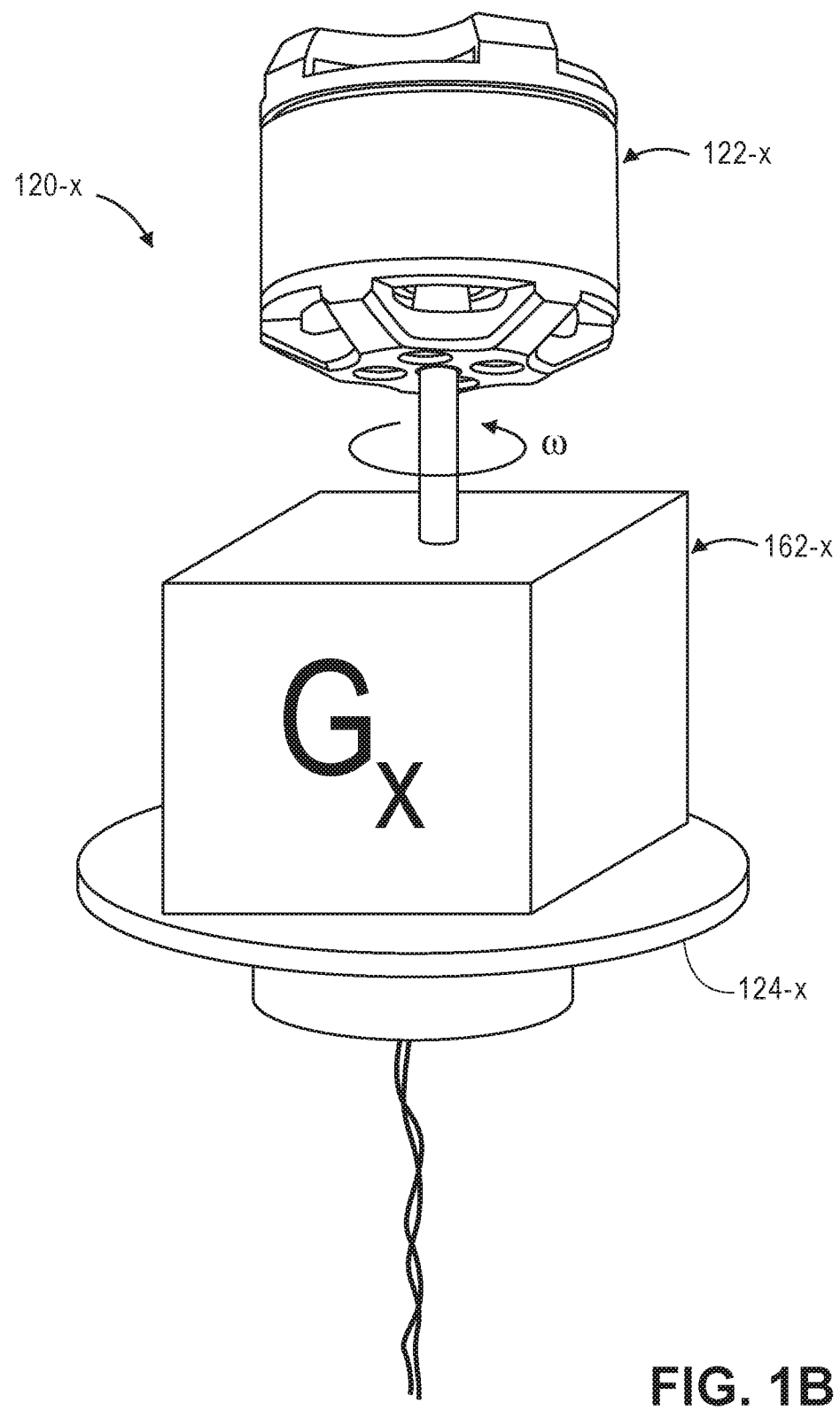

In accordance with the present disclosure, one or more of the gyroscopes 162-x, 162-y, 162-z and the accelerometers 164-x, 164-y, 164-z may be coupled to motors or motorized systems and subjected to inertial motion. As is shown in FIG. 1B, a rotation testing unit 120-x includes a motor 122-x and a slip ring 124-x. The gyroscope 162-x is mechanically coupled to a shaft or other rotatable component of the motor 122-x, which is configured to rotate the gyroscope 162-x at a selected angular velocity, and electrically coupled to the inertial navigation system 160 (not shown in FIG. 1B) by way of one or more cables or other connectors. Alternatively, in some embodiments, the gyroscope 162-x may be in communication with the inertial navigation system 160 by one or more wireless protocols, and cables or connectors need not be utilized. During rotation of the motor 122-x, the gyroscope 162-x is configured to return signals representative of the rotation, e.g., angular velocities, sensed by the gyroscope 162-x to the internal navigation system 160 (not shown in FIG. 1B) by way of the one or more cables or according to one or more wireless protocols.

Figure 1C:
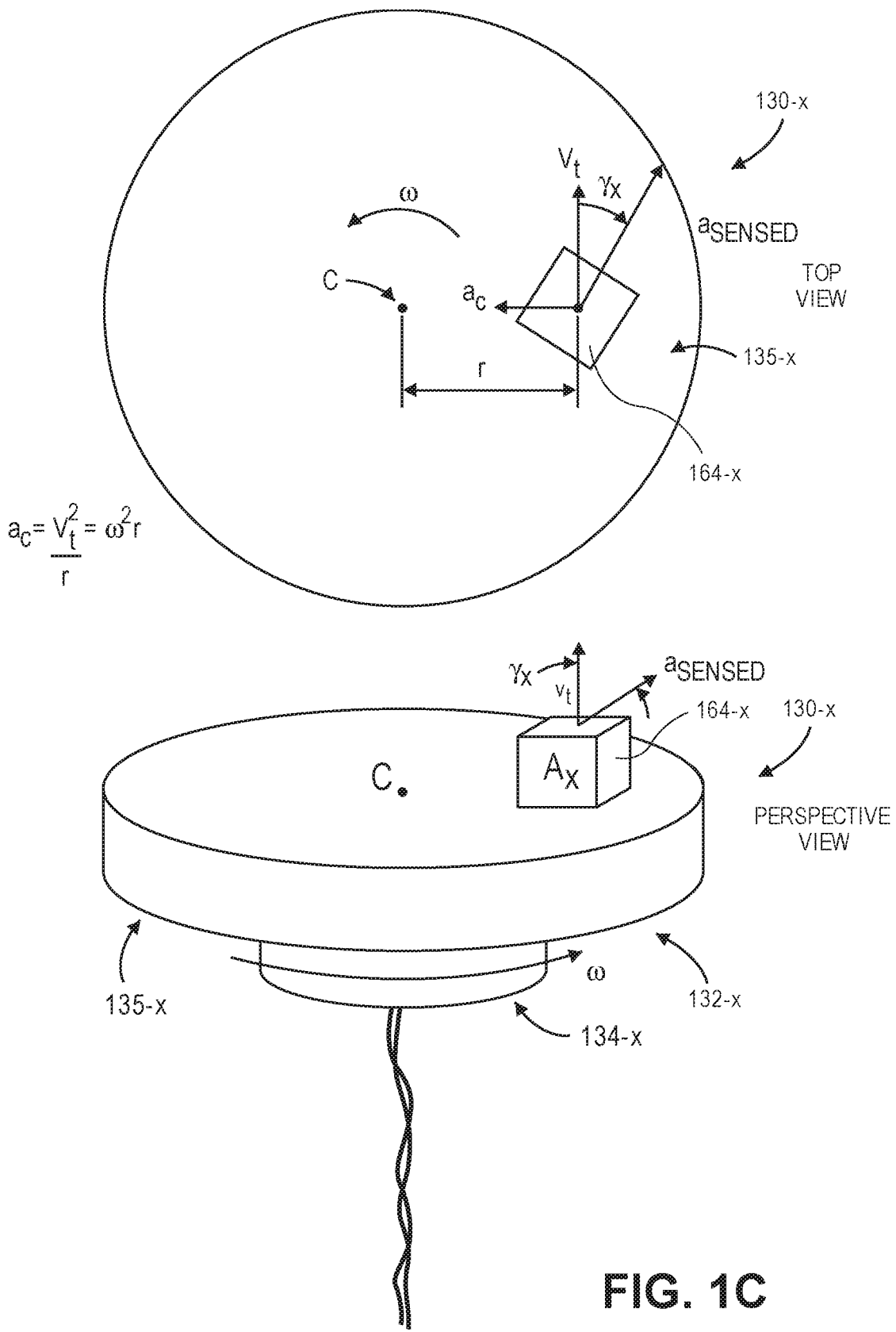

Likewise, as is shown in FIG. 1C, an acceleration testing unit 130-x includes a motor 132-x, a slip ring 134-x, and a turntable 135-x. The motor 132-x is mechanically coupled to the turntable 135-x, and configured to rotate the turntable 135-x at a selected angular velocity. The accelerometer 164-x is mechanically coupled to a rotating surface of the turntable 135-x, at a radius r from a center C of the rotating surface of the turntable 135-x, in a pivotable manner that enables the accelerometer 164-x to be aligned at a selected angle of sensitivity $\gamma_x$ along which sensed acceleration $a_{SENSED}$ is determined. The angle of sensitivity $\gamma_x$ may be defined with respect to a direction of linear motion of the accelerometer 164-x, such as is shown in FIG. 1C, or, alternatively, with respect to the radius r to the center of the rotating surface of the turntable 135-x. When the turntable 135-x rotates at a constant angular velocity $\omega$, or with the constant linear velocity $v_r$, the accelerometer 164-x is subject to centripetal (viz., center-seeking) acceleration, or $a_c$, having a value of $v_r^2/r$, or $\omega^2 r$, directed toward the center C. The angle of sensitivity $\gamma_x$ thus determines a portion or amount of that centripetal acceleration or $a_c$ that is ultimately sensed by the accelerometer 164-x, or $a_{SENSED}$, according to one or more trigonometric relationships or equations (e.g., a ratio of the sensed acceleration $a_{SENSED}$ to the centripetal acceleration $a_c$). The accelerometer 164-x is also electrically coupled to the inertial navigation system 160 (not shown in FIG. 1C) by way of one or more cables or, alternatively, one or more wireless protocols. During rotation of the turntable 135-x, the accelerometer 164-x is configured to return signals representative of the acceleration $a_{SENSED}$ sensed by the accelerometer 164-x to the internal navigation system 160 (not shown in FIG. 1C).

As is shown in FIG. 1D, the turntable 135-x further includes a motor 136-x embedded therein. The motor 136-x may include any number of automatically operable gears (e.g., racks and pinions), gear boxes, servos, hydraulic cylinders, linkages or other features for rotating a drive shaft that is aligned substantially parallel to an axis of rotation of the turntable 135-x, and substantially perpendicular to the rotating surface of the turntable 135-x. The accelerometer 164-x is coupled to the drive shaft, which is aligned at the radius r from the center C of the turntable 135-x, such that the motor 136-x may be operated to select the angle of sensitivity $\gamma_x$ of the accelerometer 164-x and, therefore, to select the value of the acceleration $a_{SENSED}$ sensed by the accelerometer 164-x, as a function of the angle of sensitivity $\gamma_x$.

Figure 1E:
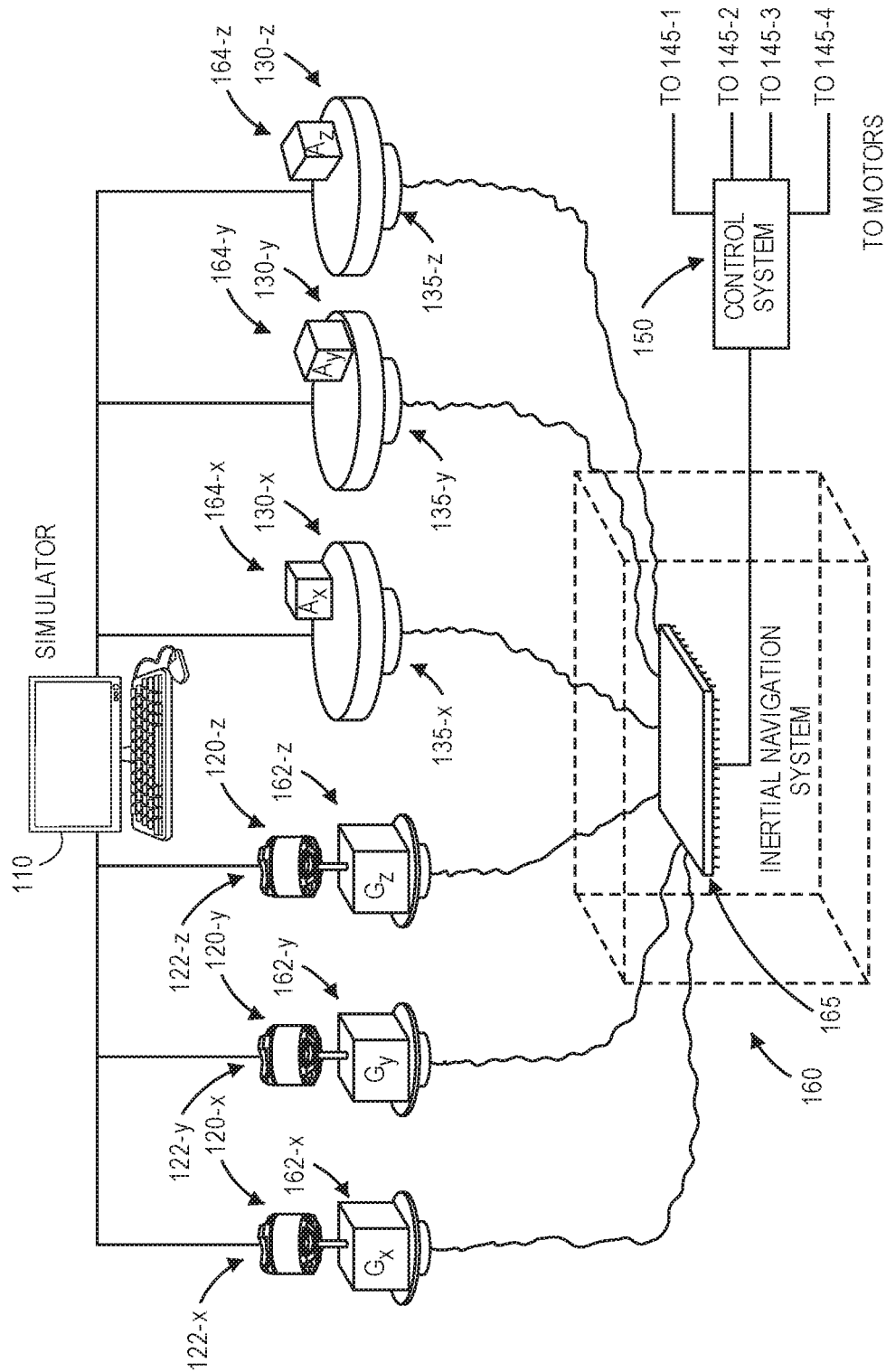

As is discussed above, one or more testing units may be independently operated to impart angular rotations or accelerations on sensors of an inertial navigation system. As is shown in FIG. 1E, three rotation testing units 120-x, 120-y, 120-z and three acceleration testing units 130-x, 130-y, 130-z are shown under control of a computer system 110 from which simulated angular velocities or accelerations may be initiated. Each of the rotation testing units 120-x, 120-y, 120-z includes a motor 122-x, 122-y, 122-z coupled to a gyroscope 162-x, 162-y, 162-z. The rotation testing units 120-y, 120-z shown in FIG. 1E may each share some or all of the same properties and features as the rotation testing unit 120-x shown in FIG. 1B, or described elsewhere herein. Each of the acceleration testing units 130-x, 130-y, 130-z includes a turntable 135-x, 135-y, 135-z coupled to an accelerometer 164-x, 164-y, 164-z. The acceleration testing units 130-y, 130-z shown in FIG. 1E may each share some or all of the same properties and functions as the acceleration testing unit 130-x shown in FIG. 1C, or described elsewhere herein.

As is also shown in FIG. 1E, each of the gyroscopes 162-x, 162-y, 162-z and each of the accelerometers 164-x, 164-y, 164-z is electronically coupled to at least one of the processors 165 of the inertial navigation system 160, which is further coupled to a control system 150 for operating the aerial vehicle 140. The control system 150 is configured to receive information regarding orientations, rotations, velocities and/or accelerations sensed by the respective gyroscopes 162-x, 162-y, 162-z and accelerometers 164-x, 164-y, 164-z from the inertial navigation system 160, and to generate one or more control signals for operating the propulsion motors 145-1, 145-2, 145-3, 145-4 or any control surfaces or other aspects of the aerial vehicle 140 (not shown) based on such information, or any other relevant information (e.g., regarding transit plans, mission requirements, sensed obstacles or any others). Alternatively, in some embodiments, the inertial navigation system 160 and the control system 150 may be a singular system for performing one or more of the functions of inertial navigation systems and one or more of the functions of control systems described herein.

Figure 1F:
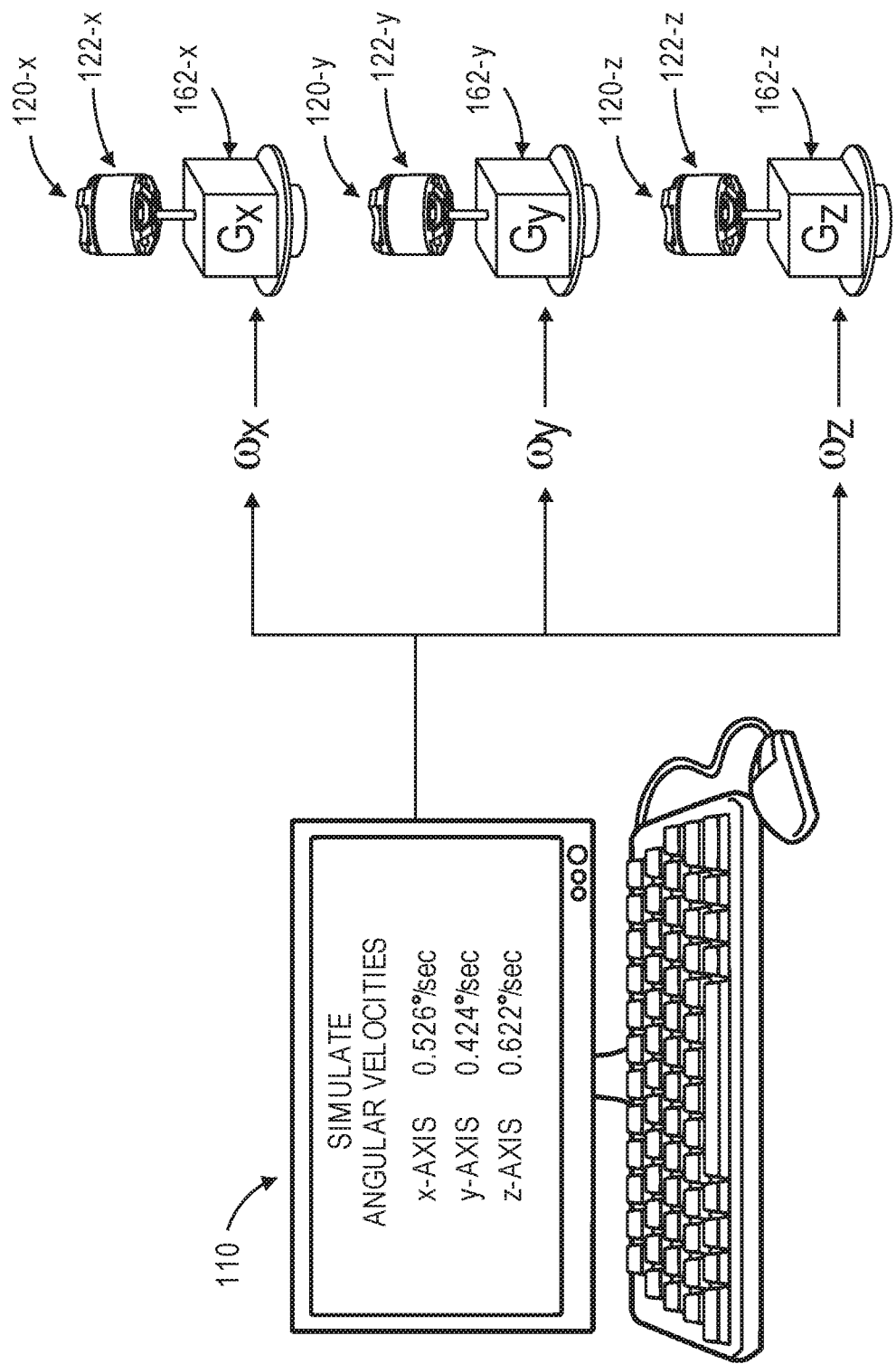

The computer system 110 may independently identify any angular velocities or accelerations to be experienced by each of the gyroscopes 162-x, 162-y, 162-z or the accelerometers 164-x, 164-y, 164-z, and may generate and transmit one or more control signals to the rotation testing units 120-x, 120-y, 120-z and the acceleration testing units 130-x, 130-y, 130-z for imparting such angular velocities or accelerations upon the gyroscopes 162-x, 162-y, 162-z or the accelerometers 164-x, 164-y, 164-z, as desired. As is shown in FIG. 1F, the computer system 110 has identified an angular velocity $\omega_x$ (e.g., a velocity about the x-axis, or roll axis) of 0.526° per second, an angular velocity $\omega_y$ (e.g., a velocity about the y-axis, or pitch axis) of 0.424° per second, and an angular velocity $\omega_z$ (or a velocity about the z-axis, or yaw axis) of 0.622° per second to be supplied to the gyroscopes 162-x, 162-y, 162-z by way of the rotation testing units 120-x, 120-y, 120-z. The angular velocities $\omega_x$, $\omega_y$, $\omega_z$ may be identified in any manner, e.g., by manual entry, or based on one or more instructions, messages or signals received by the computer system 110 over a network. For example, the aerial vehicle 140 may be scheduled or required to undergo initial (e.g., certification) maintenance, periodic (e.g., regular) maintenance, or unscheduled maintenance in response to one or more sensed conditions of the aerial vehicle 140, and the angular velocities $\omega_x$, $\omega_y$, $\omega_z$ may be selected in association with such maintenance. Additionally, the angular velocities $\omega_x$, $\omega_y$, $\omega_z$ may be selected based on a simulation of one or more flight conditions that the aerial vehicle 140 may be expected to encounter during normal or abnormal operations. Moreover, upon receiving an angular velocity to be supplied to the gyroscopes 162-x, 162-y, 162-z, the rotation testing units 120-x, 120-y, 120-z may be configured to cause the motors 122-x, 122-y, 122-z to reach the angular velocity as quickly as possible, or at a controlled rate, or on any other basis, and may further provide feedback (not shown in FIG. 1F) to the computer system 110 regarding the actual angular velocities being applied to the gyroscopes 162-x, 162-y, 162-z on a real time or near-real time basis.

Figure 1G:
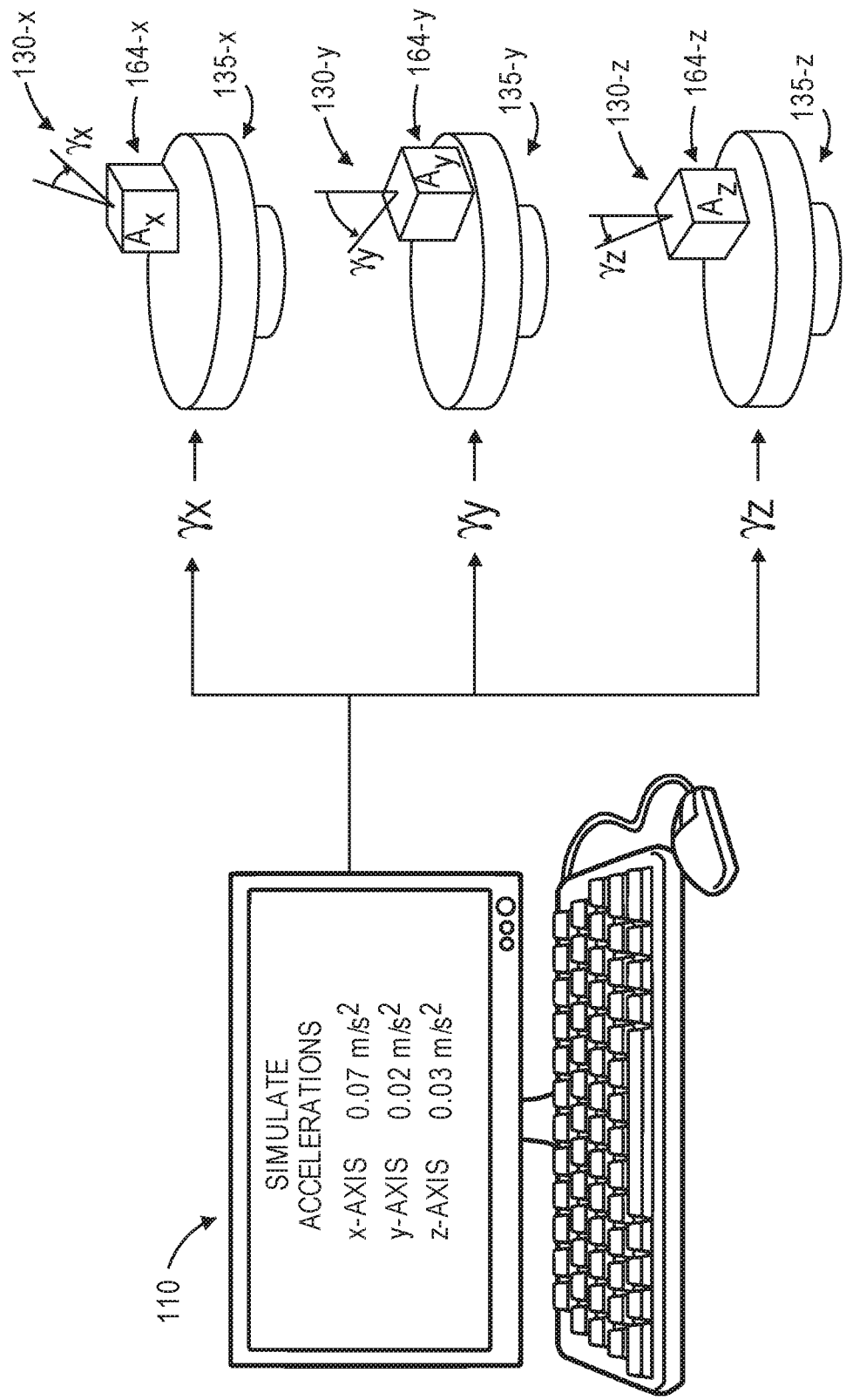

Similarly, as is shown in FIG. 1G, the computer system 110 has identified an acceleration $a_x$ (e.g., an acceleration in a direction of the x-axis, or the roll axis) of 0.07 meters per second per second (m/s$^2$), an acceleration $a_y$ (e.g., an acceleration in a direction of they-axis, or the pitch axis) of 0.02 meters per second per second (m/s$^2$) and an acceleration $a_z$ (e.g., an acceleration in a direction of the z-axis, or the yaw axis) of 0.03 meters per second per second (m/s$^2$) to be supplied to the accelerometers 164-x, 164-y, 164-z by way of the acceleration testing units 130-x, 130-y, 130-z. Like the angular velocities $\omega_x$, $\omega_y$, $\omega_z$, the accelerations $a_x$, $a_y$, $a_z$ may be identified in any manner, e.g., by manual entry, or based on one or more instructions, messages or signals received by the computer system 110 over a network. For example, the accelerations $a_x$, $a_y$, $a_z$ may be selected in association with any initial, periodic or unscheduled maintenance. Additionally, the accelerations $a_x$, $a_y$, $a_z$ may be selected based on a simulation of one or more flight conditions that the aerial vehicle 140 may be expected to encounter during normal or abnormal operations.

The accelerations $a_x$, $a_y$, $a_z$ may be supplied to the accelerometers 164-x, 164-y, 164-z as a function of the centripetal accelerations to which the respective accelerometers 164-x, 164-y, 164-z are subjected as the turntables 135-x, 135-y, 135-z rotate, and the angles of orientation of the accelerometers 164-x, 164-y, 164-z with respect to the rotation of the turntables 135-x, 135-y, 135-z. When an accelerometer is rotated by a turntable, the only acceleration experienced by the accelerometer, other than gravitational acceleration, is centripetal acceleration, viz., center-seeking acceleration. Therefore, a scalar value of centripetal acceleration $a_c$ experienced by a rotating accelerometer may be calculated as a square of an angular velocity of the accelerometer multiplied by a radius between a center of rotation and the rotating accelerometer, or $a_c = \omega^2 r$. In some embodiments, an acceleration imparted upon the rotating accelerometer may, therefore, be selected as a function of both the angular velocity of a turntable or other rotating surface to which the accelerometer is coupled and an angle of sensitivity of the accelerometer. In some other embodiments, however, the accelerometers may be rotated on a turntable or other rotating surface at a constant angular velocity, and the acceleration imparted upon the rotating accelerometer may, therefore, be selected as a function of the angle of sensitivity of the accelerometer alone. For example, with the accelerometer rotating by a turntable or other rotating surface, the accelerometer experiences a minimum acceleration (viz., zero acceleration) when a direction of sensitivity of the accelerometer is aligned perpendicular to a radius of the turntable. In such an orientation, the centripetal acceleration $a_c$, viz., center-seeking acceleration, has no effect on the sensitivity of the accelerometer. Conversely, the accelerometer experiences a maximum acceleration, viz., a full extent of the centripetal acceleration $a_c$, when a direction of sensitivity of the accelerometer is co-aligned with the radius of the turntable.

Therefore, where an angle of sensitivity is determined with respect to a direction of rotation of the accelerometer, such as the angle of sensitivity $\gamma_x$ of FIG. 1C, the acceleration imparted upon the rotating accelerometer may be calculated based on a product of the centripetal acceleration $a_c$ and a sine of the angle of sensitivity of the accelerometer, e.g., an angle by which the orientation of the accelerometer deviates from the direction of rotation. Where the angle of sensitivity is determined with respect to the radius between the accelerometer and the center of rotation, the acceleration imparted upon the rotating accelerometer may be calculated based on a product of the centripetal acceleration $a_c$ and a cosine of the angle of sensitivity of the accelerometer, e.g., an angle by which the orientation of the accelerometer deviates from the radius. An angle of sensitivity may be defined with respect to any aspect of a rotating surface, and a value of the acceleration to which the accelerometer is to be subjected may be determined based on any appropriate trigonometric relationships or equations.

Figure 1H:
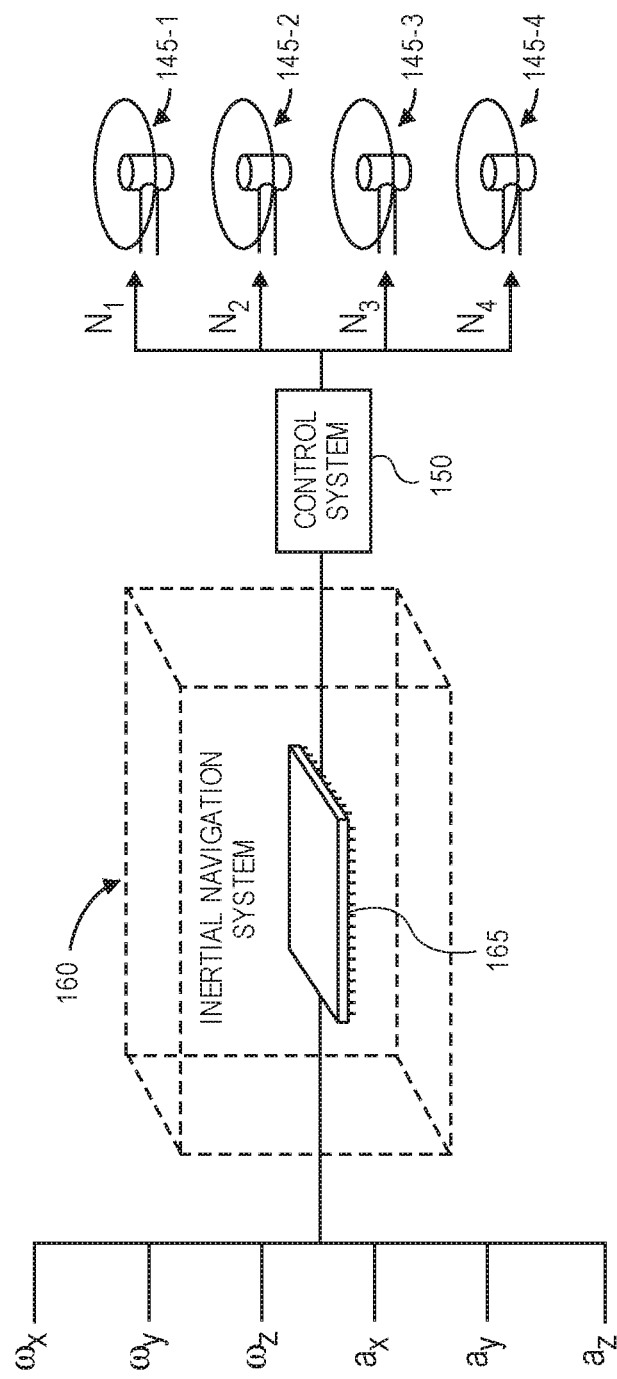

As is shown in FIG. 1H, when the inertial navigation system 160 receives each of the sensed angular velocities $\omega_x$, $\omega_y$, $\omega_z$ and each of the sensed accelerations $a_x$, $a_y$, $a_z$, the inertial navigation system 160 may transmit one or more signals, messages or instructions to the control system 150. The control system 150 may then provide one or more signals, messages or instructions to the propulsion motors 145-1, 145-2, 145-3, 145-4, for causing the propulsion motors 145-1, 145-2, 145-3, 145-4 to rotate at power levels and/or speeds selected in response to the sensed angular velocities $\omega_x$, $\omega_y$, $\omega_z$ and the sensed accelerations $a_x$, $a_y$, $a_z$. Alternatively, or additionally, the control system 150 may provide one or more signals, messages or instructions to one or more control surfaces (e.g., wings, rudders, ailerons, elevators, flaps, brakes, slats or other surfaces) for causing the control surface to rotate, deflect or otherwise operate in response to the sensed angular velocities $\omega_x$, $\omega_y$, $\omega_z$ and the sensed accelerations $a_x$, $a_y$, $a_z$.

The systems and methods of the present disclosure are directed to simulating inertial motion on a body, such as an aerial vehicle, by imparting actual inertial motion to one or more sensors of the body, such as gyroscopes and/or accelerometers of an inertial navigation system (or inertial measurement unit) of an aerial vehicle. A gyroscope may be mechanically coupled to a motor, and electrically coupled to an inertial navigation system by way of one or more connectors extending through a slip ring or other feature, or in any other manner. The motor may be rotated at a desired angular velocity by operating the motor at any selected power level or speed, and the gyroscope may generate and transmit one or more signals indicative of the angular velocity sensed during the operation of the motor to the inertial navigation system. Similarly, an accelerometer may be mechanically coupled to a rotatable surface, e.g., a turntable, away from a center of the rotatable surface and in a pivotable manner that enables the accelerometer to be aligned in any orientation with respect to a radius to the center or a direction of rotation. An angular velocity of the rotatable surface may be selected to generate a sufficient amount of centripetal acceleration on the accelerometer, and an angle of orientation of the accelerometer may be selected to determine an extent of the centripetal acceleration sensed by the accelerometer. The accelerometer may generate and transmit one or more signals indicative of the acceleration sensed during the rotation by the rotatable surface to the inertial navigation system.

The systems and methods of the present disclosure thus enable an inertial navigation system (or inertial measurement unit) to simulate the effects of inertial motion by subjecting one or more sensors of the inertial navigation system, e.g., gyroscopes and/or accelerometers, to actual inertial motion by way of one or more motors or motorized components, such as turntables or other rotatable surfaces. The systems and methods of the present disclosure thus provide effective and inexpensive means for evaluating the operability of an inertial navigation system, or a vehicle having the inertial navigation system thereon, e.g., by removing the one or more gyroscopes or accelerometers therefrom and imparting actual inertial motion onto the sensors. Signals received by the inertial navigation system from such sensors may be evaluated and compared to the actual inertial motion imparted upon the sensors to determine whether the inertial navigation system, or the sensors, are operating properly. Moreover, in order to validate the responsiveness of the inertial navigation system, the gyroscopes and the accelerometers may be subjected to actual inertial motion, and the actions observed as being taken by the inertial navigation system may be compared to the actions that are expected from the inertial navigation system in response to the actual inertial motion.

Figure 2:
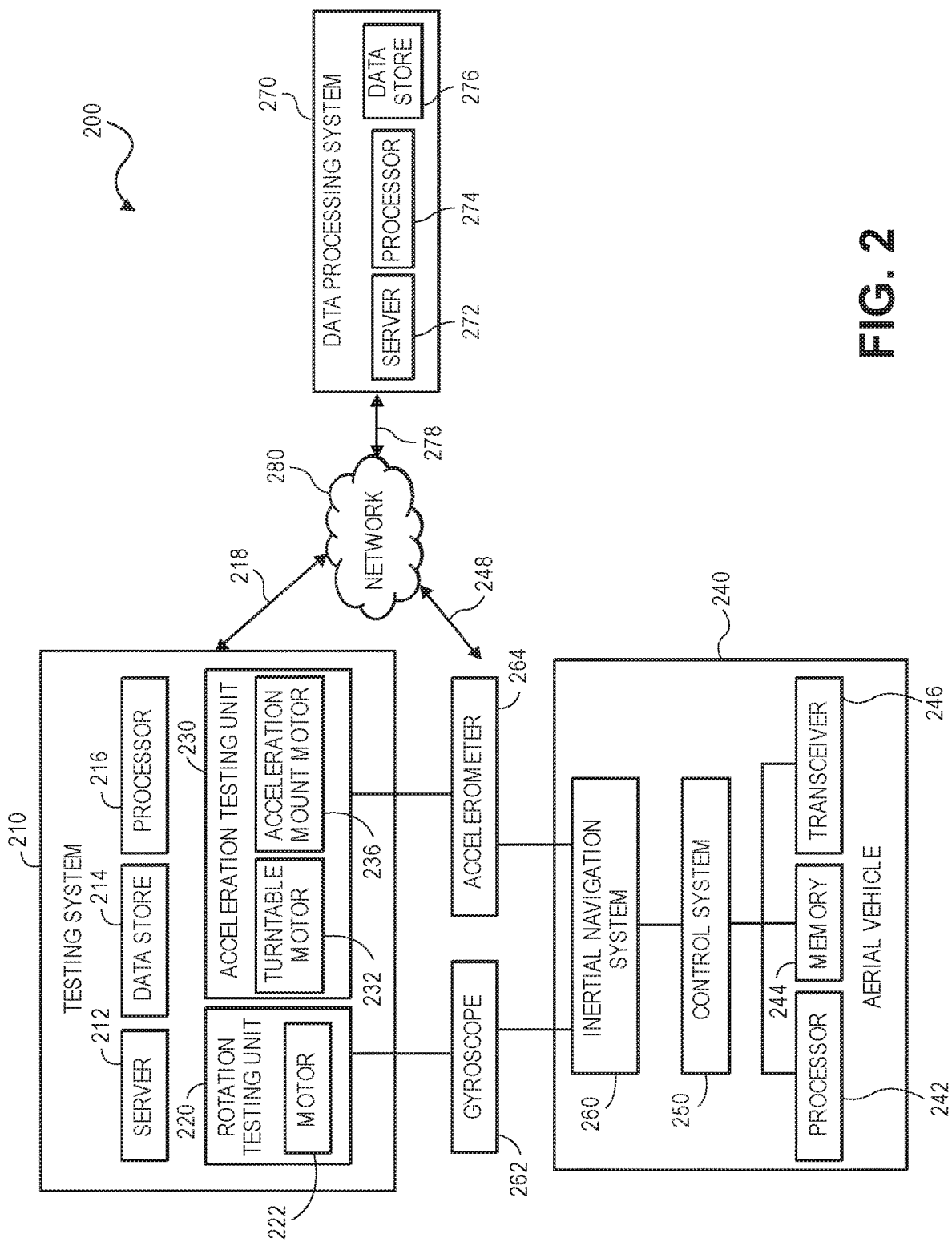
FIG. 2 is a block diagram of one system for simulating inertial motion in accordance with embodiments of the present disclosure.

Referring to FIG. 2, a block diagram of one system 200 for simulating inertial motion in accordance with embodiments of the present disclosure is shown. The system 200 of FIG. 2 includes a testing system 210, an aerial vehicle 240 and a data processing system 270 that are connected to one another over a network 280, which may include the Internet, in whole or in part. Except where otherwise noted, reference numerals preceded by the number "2" shown in FIG. 2 indicate components or features that are similar to components or features having reference numerals preceded by the number "1" shown in FIGS. 1A through 1H.

The testing system 210 may be associated with any facility, structure, station or other location where one or more operations, inspections or other evolutions may be performed on aspects of inertial navigation systems, such as the inertial navigation system 260. In some embodiments, the testing system 210 may include one or more features or components for enabling arrivals or departures of aerial vehicles therefrom. For example, in some embodiments, the testing system 210 may be provided in association with one or more facilities, structures, stations or locations associated with one or more missions to be performed by the aerial vehicle 240, e.g., delivery or surveillance operations. In some other embodiments, the testing system 210 may be an independent or freestanding facility, structure, station or location not associated with any one specific mission, or with any one specific aerial vehicle.

As is shown in FIG. 2, the testing system 210 includes a number of computer components, including but not limited to one or more computer servers 212, one or more data stores (e.g., databases or other memory components) 214 and one or more processors 216. The testing system 210 further includes one or more rotation testing units 220 and one or more acceleration testing units 230. The rotation testing unit 220 includes one or more motors 222, e.g., for rotating a gyroscope about an axis defined by a drive shaft of the motor. The acceleration testing unit 230 includes one or more turntable motors 232, e.g., for rotating a turntable or other rotatable surface to which an accelerometer is mechanically coupled, and one or more accelerometer mount motors 236, e.g., for orienting an accelerometer in a selected orientation about an axis perpendicular to an axis of rotation of the turntable. Additionally, in some embodiments, the testing system 210 may further include any number of other sensors, power supplies, computer components or other systems (not shown) for aiding in the operations, inspections or evolutions to be performed at or in association with the testing system 210.

The servers 212, the data stores 214 and the processors 216 may be provided for controlling any aspect of the operations of the testing system 210, including but not limited to receiving, analyzing and/or storing information or data associated with the operation of the motors 222, 232, 236, e.g., by one or more signals, messages or instructions. For example, in accordance with some embodiments of the present disclosure, the servers 212 and/or the processors 216 may transmit instructions to the motors 222, 232, 236, regarding a testing sequence to be performed at the testing system 210, including but not limited to times at which the motors 222, 232 are to be operated to cause a gyroscope 262 and/or an accelerometer 264 to rotate at a selected angular velocity, power levels and/or speeds at which the motors 222, 232, 236 are to be operated, angles of orientation at which the accelerometer 264 is to be oriented with respect to operating surfaces by the accelerator mount motor 236, or any other instructions. The servers 212 and/or the processors 216 may also receive information or data from the aerial vehicle 240 and/or the inertial navigation system 260, including but not limited to testing data captured during the execution of a testing sequence, and store such information or data in the one or more databases 214. Additionally, the servers 212 and/or the processors 216 may also communicate with the aerial vehicle 240, the data processing system 270 or one or more other computer devices (not shown) over the network 280, as indicated by line 218, through the sending and receiving of digital data.

The motors 222, 232, 236 may be any type or form of electrical, mechanical and/or hydraulic or other component or actuator for rotating, translating or otherwise repositioning or reorienting the gyroscope 262 and/or the accelerometer 264, respectively. For example, the motors 222, 232, 236 may be any type or form of motor (e.g., electric, gasoline-powered or any other type of motor) capable of generating selected rotational speeds, e.g., for rotating the gyroscope 262 directly, or for rotating a turntable or other rotatable surface to which the accelerometer 264 is pivotably coupled. The accelerometer mount motor 236 may be any motor (e.g., a servo motor, or any other type of motor) capable of reorienting the accelerometer 264 to a selected angle of orientation with respect to the turntable or other rotatable surface. In some embodiments, one or more of the motors 222, 232, 236 may be a brushless direct current (DC) motor such as an outrunner brushless motor or an inrunner brushless motor. The motors 222, 232, 236 may have the same capacities or ratings, or be aligned or configured to operate at the same speeds, or, alternatively, may have different capacities or ratings, or be aligned or configured to operate at different speeds. Although FIG. 2 shows only a single box corresponding to a single rotation testing unit 220 and motor 222 for rotating a single gyroscope 262, and although FIG. 2 shows only a single box corresponding to a single acceleration testing unit 230 with a turntable motor 232 and accelerometer mount motor 236 for rotating a rotatable surface to which the accelerometer 264 may be pivotably coupled or reorienting the accelerometer 264 with respect to the rotatable surface, those of ordinary skill in the pertinent arts will recognize that the testing facility 210 may include any number of the rotation testing units 220 for rotating any number of gyroscopes 262, and any number of the acceleration testing units 230 for rotating any number of rotatable surfaces having any number of accelerometers 264 pivotably coupled thereto, or for reorienting such accelerometers 264 with respect to such rotatable surfaces. For example, in some embodiments, the testing system 210 may include three rotation testing units 220 for rotating three gyroscopes 262, and three acceleration testing units 230 for rotating three rotatable surfaces with three accelerometers 264 pivotably coupled thereto, and for respectively reorienting the three accelerometers 264 with respect to such rotatable surfaces.

As is also shown in FIG. 2, the aerial vehicle 240 comprises a processor 242, a memory component 244 and a transceiver 246, as well as a control system 250 and an inertial navigation system (or inertial measurement unit) 260. Additionally, the aerial vehicle 240 may include any number of other components, including but not limited to airframes, propulsion motors, propellers, control surfaces, item engagement systems, landing gear components, lighting systems, sensors, or others (not shown).

The processors 242 may be configured to perform any type or form of computing function. For example, the processors 242 may control any aspects of the operation of the aerial vehicle 240 and any computer-based components thereon, including but not limited to propulsion motors, propellers, control surfaces, item engagement systems, landing gear components, lighting systems, imaging devices or other operational or environmental sensors. For example, the processors 242 may control the operation of one or more control systems or modules, such as the control system 250, for generating instructions for conducting operations of the aerial vehicle 240, including but not limited to instructions for causing propulsion motors to operate at a predetermined or selected speed, for causing propellers to rotate at a predetermined or selected pitch or configuration, or for causing one or more sensors to capture information or data of any type or form. Similarly, the processors 242 may control the operation of one or more control surfaces, including but not limited to wings, rudders, ailerons, elevators, flaps, brakes, slats or other features. The processors 242 may communicate with the data processing system 270 or one or more other computer devices (not shown) over the network 280, through the sending and receiving of digital data, as indicated by the line 248.

The processors 242 may be a uniprocessor system including one processor, or a multiprocessor system including several processors (e.g., two, four, eight, or another suitable number), and may be capable of executing instructions. For example, in some embodiments, the processors 242 may be a general-purpose or embedded processor implementing any of a number of instruction set architectures (ISAs), such as the x86, PowerPC, SPARC, or MIPS ISAs, or any other suitable ISA. Where one or more of the processors 242 is a part of a multiprocessor system, each of the processors within the multiprocessor system may implement the same ISA, or different ISAs.

Additionally, the memory or storage components 244 (such as databases or data stores) are configured for storing any type of information or data, e.g., instructions for operating the aerial vehicle 240, or information or data captured during operations of the aerial vehicle 240. The memory components 244 may be configured to store executable instructions, flight paths, flight control parameters and/or other data items accessible by or to the processors 242. The memory components 244 may be implemented using any suitable memory technology, such as static random-access memory (SRAM), synchronous dynamic RAM (SDRAM), nonvolatile/Flash-type memory, or any other type of memory. In some embodiments, program instructions, flight paths, flight control parameters and/or other data items may be received or sent via the transceivers 246, e.g., by transmission media or signals, such as electrical, electromagnetic, or digital signals, which may be conveyed via a communication medium such as a wired and/or a wireless link.

The transceivers 246 may be configured to enable the aerial vehicle 240 to communicate using one or more wired or wireless systems or components, e.g., wired technologies such as Universal Serial Bus (or "USB") or fiber optic cable, or standard wireless protocols, such as over the network 280 or directly. In some embodiments, the transceivers 246 may be configured to transmit and receive electromagnetic signals, such as one or more radiofrequency signals, and may include one or more components configured to transmit such signals according to Bluetooth® or any Wireless Fidelity (or "Wi-Fi") protocol. In some embodiments, the transceivers 246 may be configured to transmit and receive light signals, and may include one or more light emitting diode (or "LED") transmitters and/or one or more optical sensors or receivers. In still other embodiments, the transceivers 246 may be configured to transmit and receive acoustic signals, and may include one or more devices having transducers for converting electrical signals into sound energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters, as well as one or more microphones, piezoelectric sensors, vibration sensors or other acoustic sensors. Such signals may be open and unencrypted, and captured and interpreted by any vehicle, station or object within a signal range of the transceivers 246, or subject to any form or level of encryption.

The transceivers 246 may further include or be in communication with one or more input/output (or "I/O") interfaces, network interfaces and/or input/output devices, and may be configured to allow information or data to be exchanged between one or more of the components of the aerial vehicle 240, or to one or more other computer devices or systems via the network 280. For example, in some embodiments, the transceivers 246 may be configured to coordinate I/O traffic between the processors 242 and one or more onboard or external computer devices or components. The transceivers 246 may perform any necessary protocol, timing or other data transformations in order to convert data signals from a first format suitable for use by one component into a second format suitable for use by another component. In some embodiments, the transceivers 246 may include support for devices attached through various types of peripheral buses, e.g., variants of the Peripheral Component Interconnect (PCI) bus standard or the Universal Serial Bus (USB) standard. In some other embodiments, functions of the transceivers 246 may be split into two or more separate components, or integrated with the processors 242. Although the transceiver 246 is shown in FIG. 2 as a single component for transmitting and/or receiving information or data, those of ordinary skill in the pertinent arts will recognize that the aerial vehicle 240 may include any number of transceivers 246, or, alternatively or additionally, any number of other transmitting and/or receiving devices that may be provided as discrete components.

The control system 250 may include one or more electronic speed controls, power supplies, navigation systems and/or payload engagement controllers for controlling the operation of the aerial vehicle 240 and for engaging with or releasing items (not shown), as desired. For example, the control system 250 may be configured to cause or control the operation of one or more of propulsion motors, propellers, sensors or other aspects of the aerial vehicle 240, such as to cause one or more of propulsion motors to rotate propellers at a desired speed, in order to guide the aerial vehicle 240 along a determined or desired flight path, or to perform any other function. The control system 250 may also be configured to cause or control the operation of one or more sensors, which may include but are not limited to imaging devices, acoustic sensors, light sensors, or any other type or form of environmental and/or operational sensors (not shown). The control system 250 may further control other aspects of the aerial vehicle 240, including but not limited to the operation of one or more control surfaces (not shown) such as wings, rudders, ailerons, elevators, flaps, brakes, slats or other features within desired operating ranges, or the enactment with or release of one or more items by one or more engagement systems (not shown). In some embodiments, the control system 250 may be integrated with one or more of the processors 242, the memory components 244 and/or the transceivers 246.

As is discussed above, in some embodiments, the aerial vehicle 240 may include one or more propulsion motors (e.g., electric, gasoline-powered or any other motor) joined to an airframe and capable of generating sufficient rotational speeds of corresponding propellers or other components to provide lift and/or thrust forces to the aerial vehicle 240 and any payload engaged thereby, such as to aerially transport the engaged payload from one location to another. For example, one or more of such propulsion motors may be a brushless direct current (DC) motor such as an outrunner brushless motor or an inrunner brushless motor. Additionally, the propulsion motors of the aerial vehicle 240 may be of any kind, and may be dedicated to one or more purposes or functions. For example, one or more of the propulsion motors may be aligned or configured to provide forces of lift to the aerial vehicle 240, exclusively, while one or more of the propulsion motors may be aligned or configured to provide forces of thrust to the aerial vehicle 240, exclusively. Alternatively, one or more of the propulsion motors may be aligned or configured to provide forces of lift and/or forces of thrust to the aerial vehicle 240, as needed. For example, such propulsion motors may be fixed in their orientation on the aerial vehicle 240, or configured to vary their respective orientations, e.g., a tilt-rotor aircraft. Moreover, such propulsion motors may be aligned or configured to operate with different capacities or ratings, or at different speeds, or coupled to propellers having different sizes and shapes. Such propulsion motors may be controlled by the processors 242, the control system 250, or any other aspect of the aerial vehicle 240.

Additionally, the propulsion motors of the aerial vehicle 240 may be coupled to one or more propellers, e.g., any rotors or rotatable systems having a plurality of shaped blades joined to a hub or boss. Each of such propellers may be rotatably mounted to a mast or drive shaft associated with a corresponding one of the propulsion motors and configured to generate forces of thrust when rotated within a fluid. Each of such propellers may also include any number of blades, and may be fixed pitch, adjustable pitch or variable pitch in nature. Moreover, one or more of the propellers may be banded or shielded in any manner. In some embodiments, one or more of the propellers may be configured to rotate about a vertical axis, and to provide forces of thrust in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of thrust in directions corresponding to such axes accordingly. Such propellers may be controlled by the processors 242, the control system 250, or any other aspect of the aerial vehicle 240.

The inertial navigation system (or inertial measurement unit) 260 may be any type or form of device for sensing changes in linear or rotational motion of the aerial vehicle 240, or for interpreting such changes in order to maintain the aerial vehicle 240 on a desired course, at a desired speed, or at a desired altitude, or to effectuate any desired changes in course, speed or altitude As is shown in FIG. 2, the inertial navigation system 260 includes one or more gyroscopes 262 and one or more accelerometers 264, along with one or more compasses (or other magnetometer) (not shown), and/or one or more Global Positioning System ("GPS") transceivers (not shown). In some embodiments, the inertial navigation system 260 may be installed onboard the aerial vehicle 240 and intended for use during in-flight operations.

The gyroscopes 262 may be any mechanical or electrical device, component, system, or instrument for determining an orientation, e.g., the orientation of the aerial vehicle 240. For example, the gyroscope 262 may be a traditional mechanical gyroscope having at least a pair of gimbals and a flywheel or rotor. Alternatively, the gyroscope 262 may be an electrical component such a dynamically tuned gyroscope, a fiber optic gyroscope, a hemispherical resonator gyroscope, a London moment gyroscope, a microelectromechanical sensor gyroscope, a ring laser gyroscope, or a vibrating structure gyroscope, or any other type or form of electrical component for determining an orientation of the aerial vehicle 240. The accelerometers 264 may be any mechanical or electrical devices, components, systems, or instruments for sensing or measuring accelerations, including but not limited to devices having one or more potentiometers, linear variable differential transformers, variable reluctance devices or piezoelectric components. In some embodiments, the gyroscopes 262 and the accelerometers 264 may be physically installed in association with the inertial navigation system 260 within the aerial vehicle 240 and intended for use in in-flight operations. Such gyroscopes 262 and such accelerometers 264 may be physically removed from the aerial vehicle 240 and mechanically coupled to the rotation testing units 220 and the acceleration testing units 230, respectively, and rotated and/or oriented in accordance with one or more of the systems and methods disclosed herein, while remaining electronically coupled to the inertial navigation system 260.

As is noted above, the inertial navigation system 260 may further include one or more compasses (e.g., any devices, components, systems, or instruments adapted to determine one or more directions with respect to a frame of reference that is fixed with respect to the surface of the Earth, such as a pole thereof), including one or more magnetometers or other electrical components for measuring a strength of a magnetic field, such as a vector magnetometer or a scalar magnetometer (e.g., a proton precession magnetometer, an Overhauser magnetometer, an ionized gas magnetometer, a rotating coil magnetometer, a Hall Effect magnetometer, or the like). The internal navigation system may also include one or more GPS transceivers (e.g., any devices, components, systems or instruments adapted to receive signals, such as trilateration data or information, relating to a position of the inertial navigation system 260 from one or more GPS satellites of a GPS network, or for reporting a position of the inertial navigation system 260 determined based on such signals. In some embodiments, the inertial navigation system 260 may further include any number of computer components, e.g., one or more processors, memory components and/or transceivers (not shown), or any other components for aiding in the determination of orientations, velocities and/or accelerations.

The data processing system 270 includes one or more physical computer servers 272 having one or more computer processors 274 and any number of data stores 276 (e.g., databases) associated therewith, as well as provided for any specific or general purpose. For example, the data processing system 270 of FIG. 2 may be independently provided for the exclusive purpose of receiving, analyzing or storing information regarding periods of oscillation, vectors of axes of rotation, moments of inertia, or other information or data received from the testing system 210 or the aerial vehicle 240 or, alternatively, provided in connection with one or more other physical or virtual services configured to receive, analyze or store such information or data, as well as one or more other functions. The servers 272 may be connected to or otherwise communicate with the processors 274 and the data stores 276, which may store any type of information or data, for any purpose. The servers 272 and/or the computer processors 274 may also connect to or otherwise communicate with the network 280, as indicated by line 278, through the sending and receiving of digital data. For example, the data processing system 270 may include any facilities, stations or locations having the ability or capacity to receive and store information or data, such as media files, in one or more data stores, e.g., acoustic signals or energy, or related information or data received from the aerial vehicle 240, or from one another, or from one or more other external computer systems (not shown) via the network 280. In some embodiments, the data processing system 270 may be provided in a physical location, e.g., in a location of the testing system 210, and in association with the testing system 210. In other such embodiments, the data processing system 270 may be provided in one or more alternate or virtual locations, e.g., in a "cloud"-based environment. In still other embodiments, one or more components of the data processing system 270 may be provided onboard one or more aerial vehicles, including but not limited to the aerial vehicle 240.

The network 280 may be any wired network, wireless network, or combination thereof, and may comprise the Internet in whole or in part. In addition, the network 280 may be a personal area network, local area network, wide area network, cable network, satellite network, cellular telephone network, or combination thereof. The network 280 may also be a publicly accessible network of linked networks, possibly operated by various distinct parties, such as the Internet. In some embodiments, the network 280 may be a private or semi-private network, such as a corporate or university intranet. The network 280 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The testing system 210, the aerial vehicle 240 and/or the data processing system 270 may use any web-enabled or Internet applications or features, or any other client-server applications or features including E-mail or other messaging techniques, to connect to the network 280, or to communicate with one another, such as through short or multimedia messaging service (SMS or MMS) text messages. For example, the aerial vehicle 240 may be adapted to transmit information or data in the form of synchronous or asynchronous messages to the data processing system 270 or to any other computer device (e.g., to one or more other aerial vehicles) in real time or in near-real time, or in one or more offline processes, via the network 280. Those of ordinary skill in the pertinent art would recognize that the aerial vehicle 240 or the data processing system 270 may operate or be operated by any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processors 242, the control system 250 or the processor 274, or any other computers or control systems utilized by the aerial vehicle 240 or the data processing system 270 (e.g., by one or more other aerial vehicles), and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
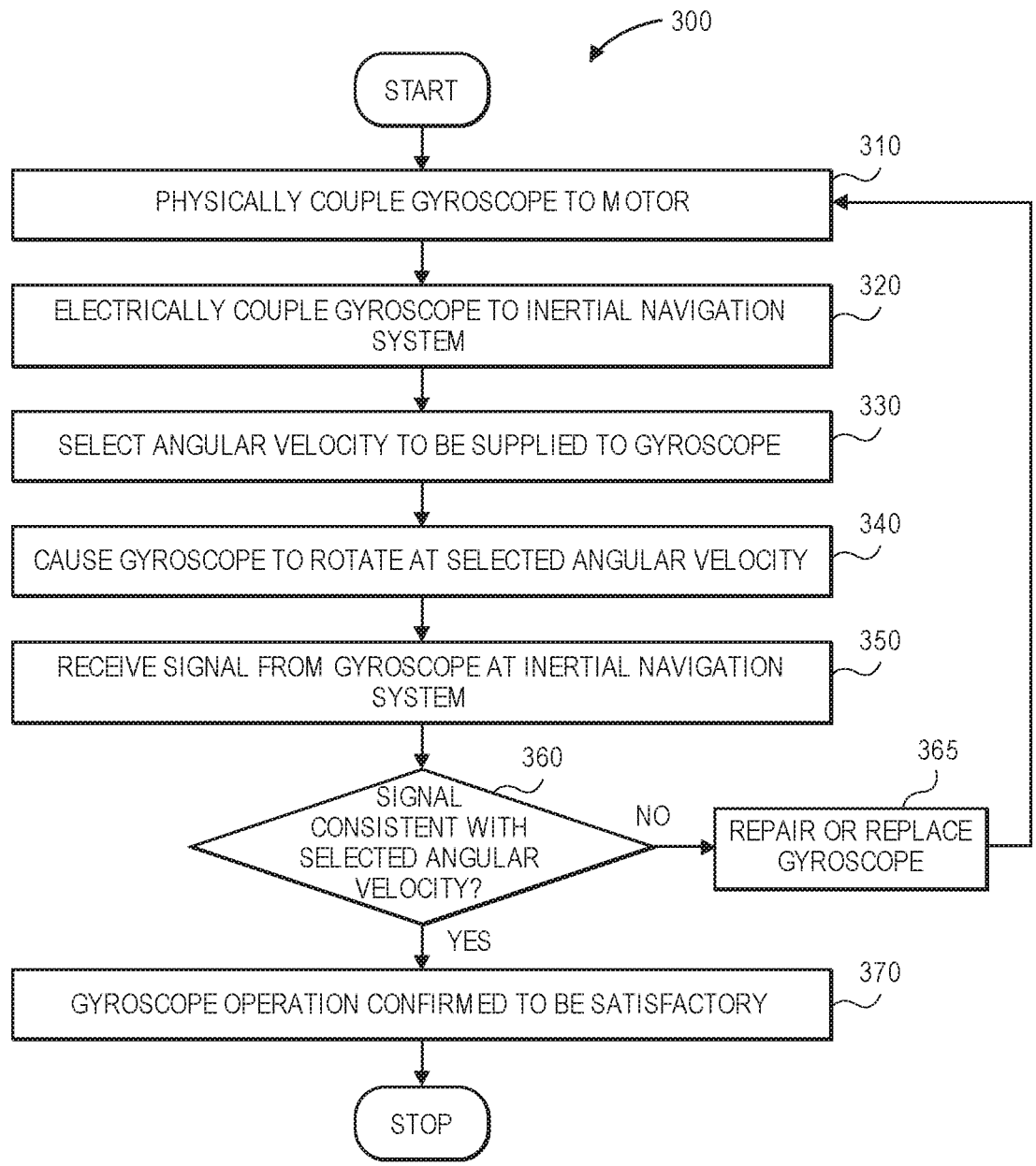
FIG. 3 is a flow chart of one method for simulating inertial motion in accordance with embodiments of the present disclosure.

As is discussed above, some embodiments of the present disclosure may be utilized to simulate the effects of inertial motion on an inertial navigation system (or inertial measurement unit), by placing one or more sensors of such systems (or units) in actual motion. In particular, by rotating gyroscopes at selected angular velocities, and by rotating specifically oriented accelerometers about axes of rotation at selected angular velocities, the effects of rotational motion on an internal navigation system may be simulated. Referring to FIG. 3, a flow chart 300 of one method for simulating inertial motion in accordance with embodiments of the present disclosure is shown. At box 310, a gyroscope is physically coupled to a motor, and at box 320, the gyroscope is electrically coupled to an inertial navigation system. For example, referring again to FIG. 1B, the gyroscope may be mounted to a distal end of a driveshaft of a motor, and may be in communication with the inertial navigation system by one or more connectors or wirelessly.

At box 330, an angular velocity to be supplied to the gyroscope is selected. The angular velocity may be selected on any basis. For example, the angular velocity may be selected based on anticipated operating conditions of the gyroscope, e.g., anticipated angles about roll, pitch or yaw axes that may be experienced by an aerial vehicle, as well as operating ranges of the gyroscope or an inertial navigation system to which the gyroscope is coupled, or any other operating factors. In some embodiments, a testing procedure or regimen may call for rotating a gyroscope at a predetermined number of angular velocities, such as to simulate the effects of flight on the inertial navigation system, or to confirm that the gyroscope and/or the inertial navigation system respond appropriately to rotation at the predetermined number of angular velocities.

At box 340, the gyroscope is caused to rotate at the selected angular velocity. For example, one or more control signals indicating a power level or speed of rotation of the motor for causing the gyroscope to rotate at the selected angular velocity may be provided to the motor. At box 350, as the gyroscope is rotating, a signal is received from the gyroscope by the inertial navigation system. The signals may be provided by the gyroscope to the inertial navigation system in real time or near-real time, and at any rate or frequency. For example, where signals are provided at a sampling frequency of 100 Hertz (Hz), such signals indicate the angular rotation sensed by the gyroscope every ten milliseconds (ms).

At box 360, whether the signal received from the gyroscope at box 350 is consistent with the selected angular velocity is determined. For example, where the motor causes the gyroscope to rotate at five degrees per second about a predetermined axis, signals received from the gyroscope may be analyzed to determine whether such signals indicate a sensed angular velocity of five degrees per second to within a predetermined degree of tolerance or confidence level. If the signal is not consistent with the selected angular velocity, then the process advances to box 365, where the gyroscope is repaired or replaced, before returning to box 310, where the gyroscope is physically coupled to a motor. If the signal is consistent with the selected angular velocity, however, then the process advances to box 370, where the operation of the gyroscope is determined to be satisfactory, and the process ends.

Any type or form of testing or evaluation of the gyroscope and/or the inertial navigation system may be performed based on the signal received at box 350. For example, in some embodiments, the responsiveness of one or more aspects of the inertial navigation system to the signal may be determined. Furthermore, although the flow chart 300 of FIG. 3 references the coupling and rotation of a single gyroscope, those of ordinary skill in the pertinent arts will recognize that a testing procedure or regimen may call for coupling and rotating multiple gyroscopes in accordance with the present disclosure, independently or along with one or more accelerometers.

Figure 4:
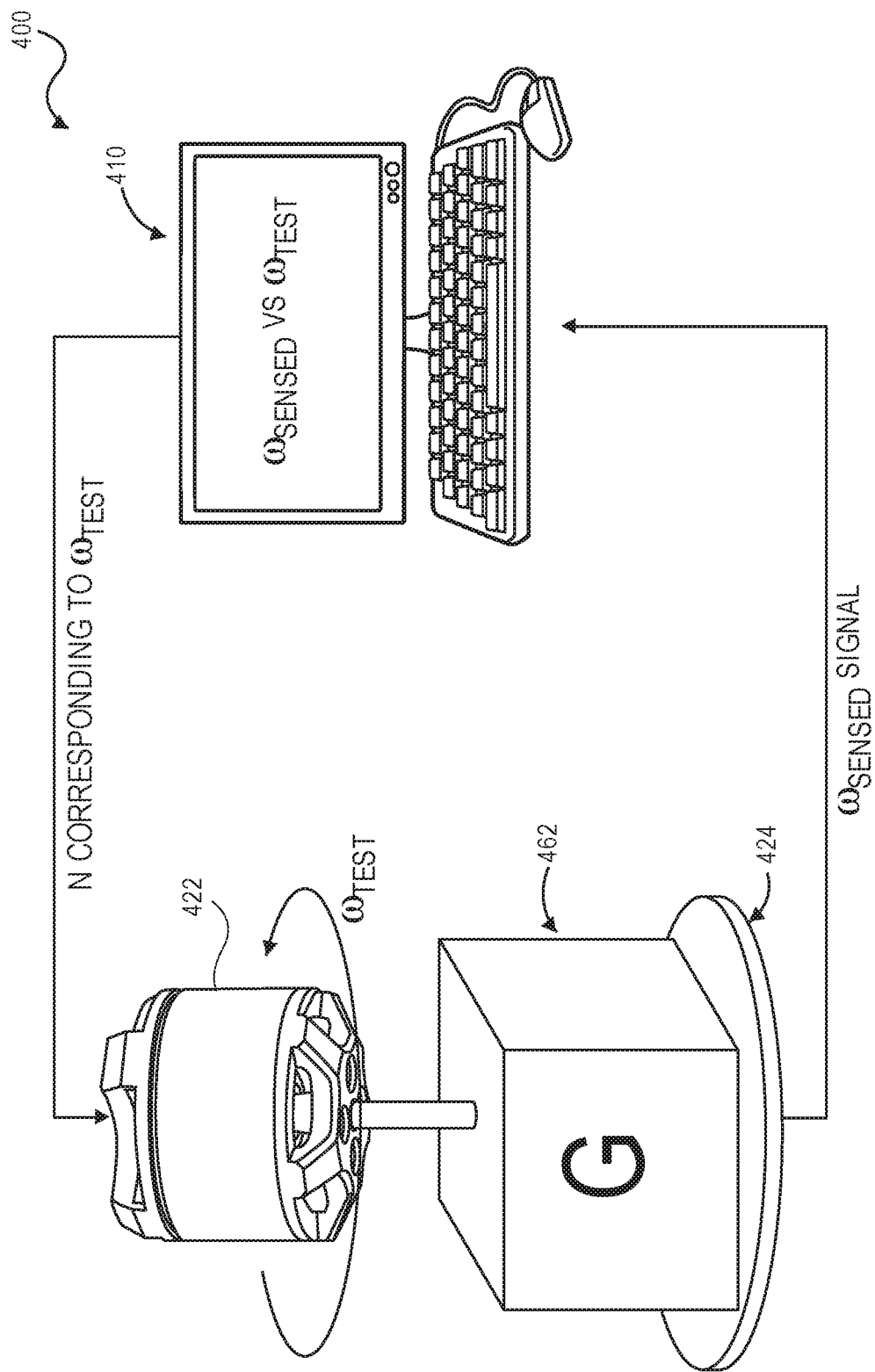
FIG. 4 is a view of aspects of one system for simulating inertial motion in accordance with embodiments of the present disclosure.

Referring to FIG. 4, a view of aspects of one system 400 for simulating inertial motion in accordance with embodiments of the present disclosure is shown. Except where otherwise noted, reference numerals preceded by the number "4" shown in FIG. 4 indicate components or features that are similar to components or features having reference numerals preceded by the number "2" in FIG. 2 or by the number "1" shown in FIGS. 1A through 1H.

The system 400 includes a computer system 410, a motor 422 and a gyroscope 462. The motor 422 and the gyroscope 462 are each in communication (e.g., electronically coupled) with the computer system 410. The gyroscope 462 is physically coupled to a driveshaft of the motor 422.

In accordance with some embodiments of the present disclosure, actual inertial motion, namely, rotation about an axis defined by the drive shaft, may be imparted upon the gyroscope 462, e.g., by providing one or more control signals to the motor 422 indicating a power level N for causing the motor 422 to rotate at a test angular velocity $\omega_{TEST}$. The gyroscope 462 is also configured to report a sensed angular velocity to the computer system 410 by a connector extending through a slip ring 424, e.g., by providing one or more signals to the computer system 410 indicating an angular velocity $\omega_{SENSED}$ sensed by the gyroscope 462. The computer system 410 may determine whether the test angular velocity $\omega_{TEST}$ is consistent with the angular velocity co SENSED, with respect to any degree of tolerance or confidence level, or according to any threshold.

Figure 5:
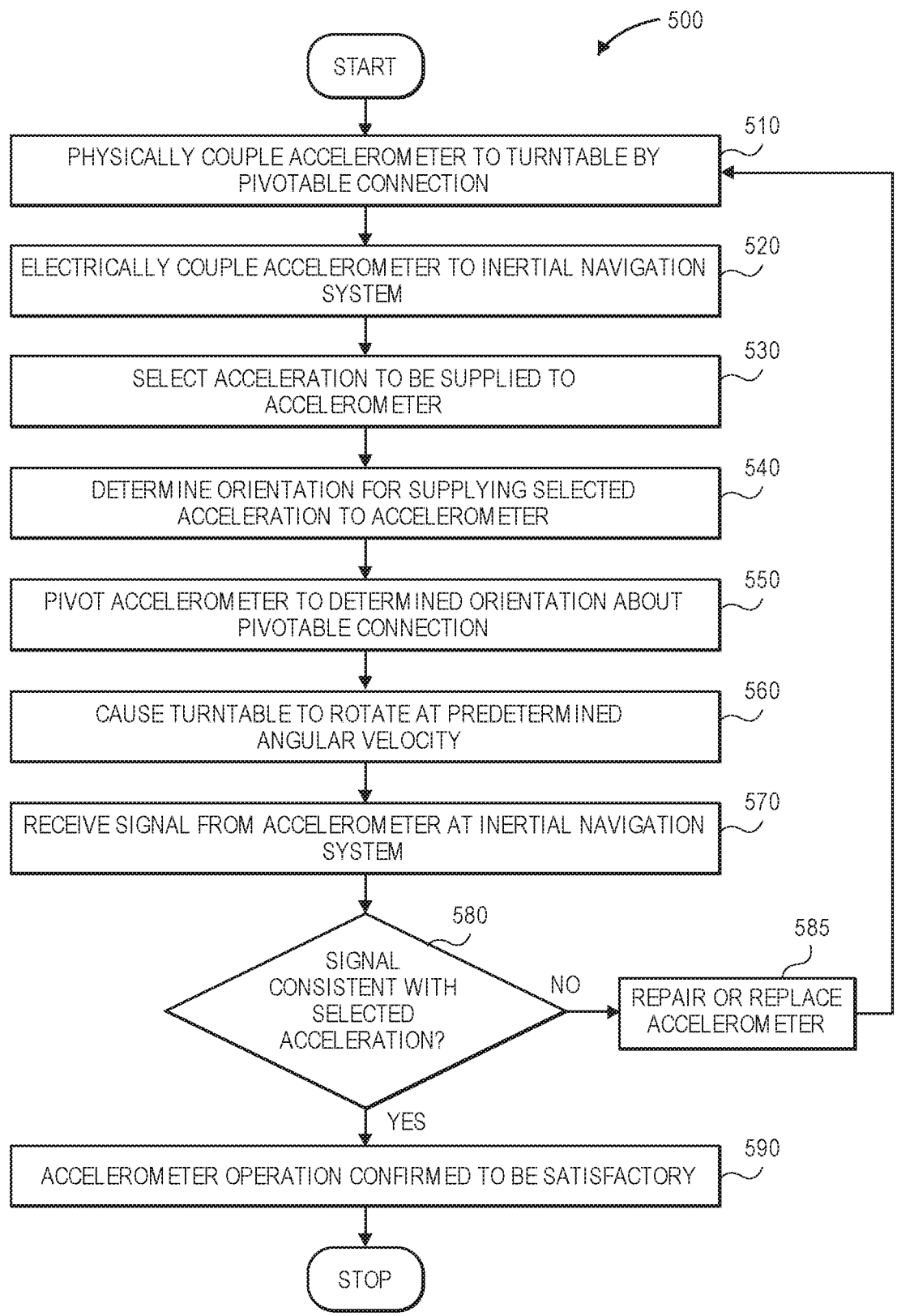
FIG. 5 is a flow chart of one method for simulating inertial motion in accordance with embodiments of the present disclosure.

Additionally, by rotating specifically oriented accelerometers about axes of rotation at selected angular velocities, the effects of acceleration on an internal navigation system may be simulated. Referring to FIG. 5, a flow chart 500 of one method for simulating inertial motion in accordance with embodiments of the present disclosure is shown. At box 510, an accelerometer is physically coupled to a turntable by a pivotable connection, and at box 520, the accelerometer is electrically coupled to an inertial navigation system. For example, referring again to FIGS. 1C and 1D, the accelerometer may be pivotably or rotatably mounted to the turntable or another rotatable surface at a predetermined radius from a center of the turntable, in a manner that enables the accelerometer to be aligned at any angle or orientation with respect to an axis about which the accelerometer is mounted. The accelerometer may be in communication with the inertial navigation system by one or more connectors or wirelessly.

At box 530, an acceleration to be supplied to the accelerometer is selected, and at box 540, an orientation for supplying the acceleration to the accelerometer is determined. For example, as is discussed above, other than acceleration due to gravity, the only acceleration acting on a rotating accelerometer is centripetal acceleration having a value equal to the linear velocity squared divided by the radius of rotation, or the angular velocity squared multiplied by the radius of rotation, i.e., $a_c = v^2/r = \omega^2 r$. As is discussed above with regard to FIGS. 1C and 1D, where the accelerometer is operated at a constant angular velocity $\omega$, a value of acceleration to be imparted upon the accelerometer may be selected as a function of the orientation of the accelerometer between a minimum value of zero (e.g., with a direction of sensitivity of the accelerometer perpendicular to a radius of a turntable) and a maximum value of the centripetal acceleration. Alternatively, in some embodiments, a value of an acceleration to be supplied to the accelerometer may be selected as functions of both an angular velocity, which may be varied, and an angle of sensitivity.

At box 550, the accelerometer is pivoted about the pivotable connection to the orientation determined at box 540. As is discussed above with regard to FIG. 1D, a turntable or other rotatable surface may be equipped with one or more motors or other systems for pivoting an accelerometer about a mounting axis, e.g., to a selected orientation with respect to a radius to the center, or with respect to a direction of rotation. In some embodiments, the accelerometer may be manually pivoted to the orientation determined at box 540 or by any other method, e.g., by hand.

At box 560, the turntable is caused to rotate at a predetermined angular velocity. For example, one or more control signals indicating a power level or a speed of rotation of one or more motors for causing the turntable to rotate at the predetermined angular velocity may be provided to the motor. Alternatively, in some embodiments, the acceleration selected at box 530 may be supplied to the accelerometer by selecting both an angular velocity of the turntable and an angle of orientation of the accelerometer, as is discussed above. At box 570, as the turntable is rotating, one or more signals are received from the accelerometer by the inertial navigation system. As is discussed above with regard to the flow chart 300 of FIG. 3, such signals may be provided by the accelerometer to the inertial navigation system in real time or near-real time, and at any rate or frequency.

At box 580, whether the signal received from the accelerometer at box 570 is consistent with the selected acceleration is determined. For example, where a motor causes the turntable to rotate at a selected angular velocity and with the accelerometer aligned at a selected angle of sensitivity on the turntable, the accelerometer is subjected to a known acceleration, e.g., the acceleration selected at box 530. The acceleration sensed by the accelerometer, as reported in the signal received from the accelerometer at box 570, may be compared to the selected acceleration to which the acceleration is subjected. If the signal is not consistent with the selected acceleration, then the process advances to box 585, where the accelerometer is repaired and replaced, before returning to box 510, where the accelerometer is physically coupled to a motor, and subjected to further testing. If the signal is consistent with the selected acceleration, however, then the process advances to box 590, where the operation of the accelerometer is determined to be satisfactory, and the process ends.

Figure 6A:
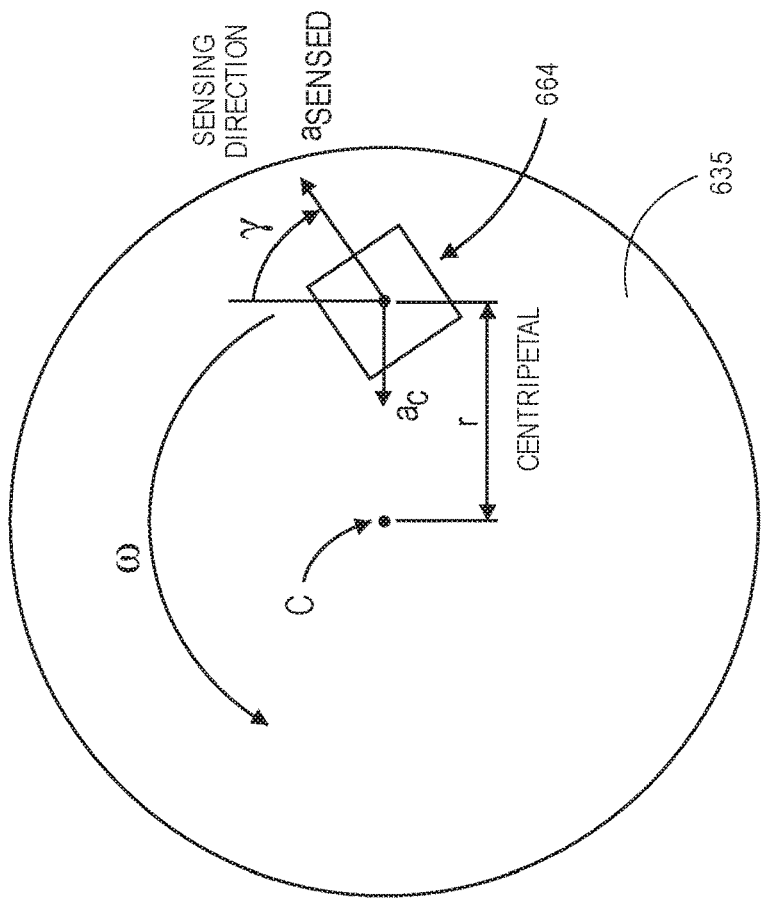
FIGS. 6A and 6B are views of aspects of one system for simulating inertial motion in accordance with embodiments of the present disclosure.
Figure 6A:
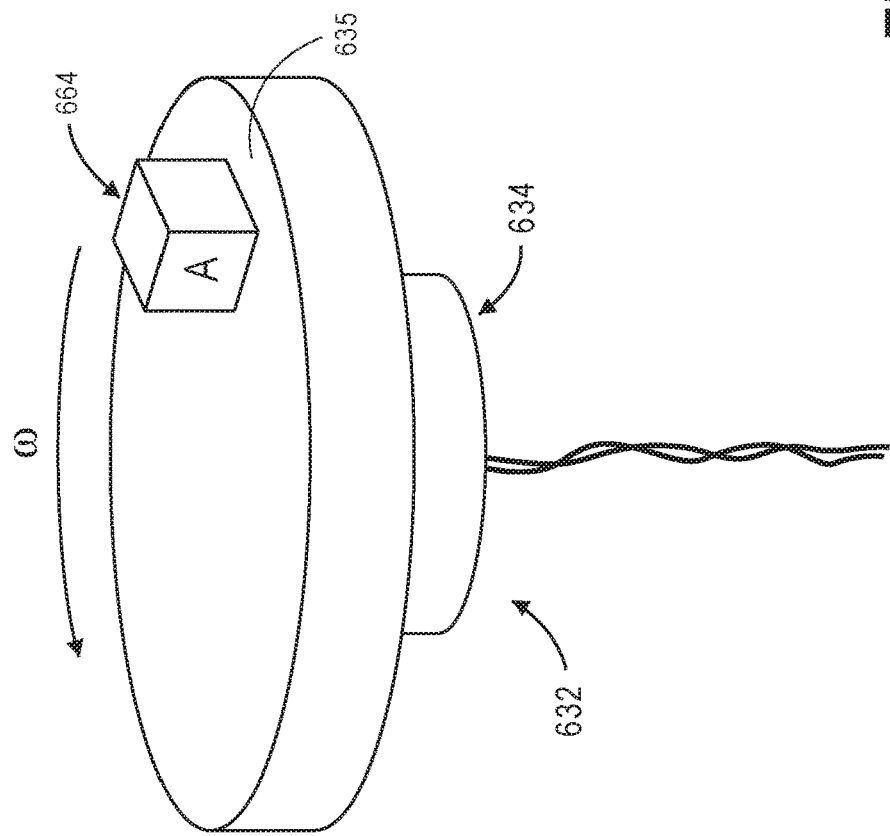
Figure 6B:
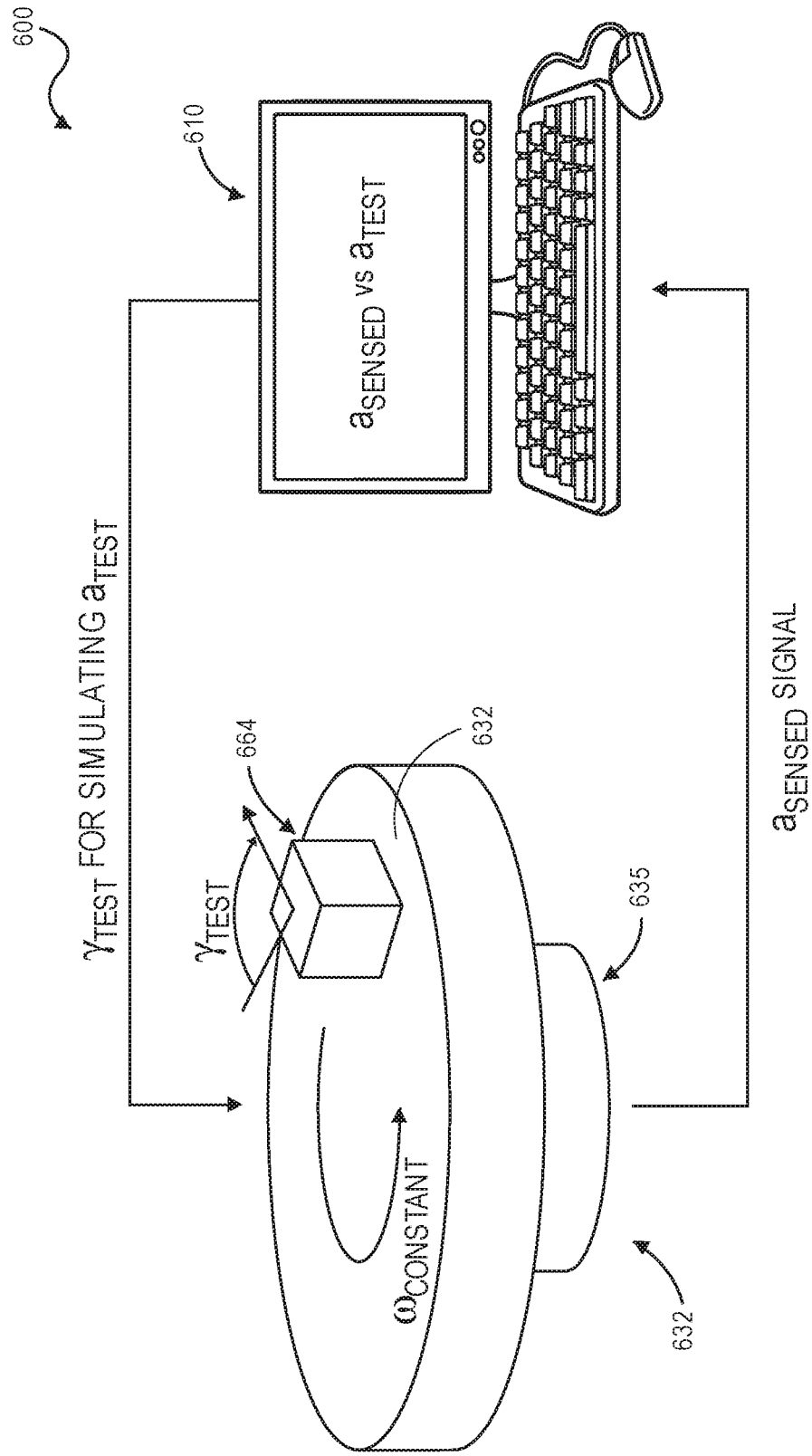

Referring to FIGS. 6A and 6B, views of aspects of one system 600 for simulating inertial motion in accordance with embodiments of the present disclosure is shown. Except where otherwise noted, reference numerals preceded by the number "6" shown in FIG. 6A or FIG. 6B indicate components or features that are similar to components or features having reference numerals preceded by the number "4" shown in FIG. 4, by the number "2" in FIG. 2 or by the number "1" shown in FIGS. 1A through 1H.

The system 600 includes a computer system 610, a motor 632, a slip ring 634, a turntable 635 and an accelerometer 664. The motor 632 and the accelerometer 664 are each in communication (e.g., electronically coupled) with the computer system 610. The motor 632 is configured to rotate the turntable 635 at a desired angular velocity. The accelerometer 664 is physically coupled to an upper surface of the turntable 635, at a radius r from a center C of the turntable 635, in a manner that enables the accelerometer 664 to be rotated at any angle of sensitivity γ with respect to a direction of rotation of the turntable 632 or the center C thereof. For example, as is discussed above with regard to FIG. 1D, the turntable 635 may further include one or more motors installed or embedded therein and configured to orient the accelerometer 664 about an axis parallel to an axis of rotation of the turntable 635, and perpendicular to the upper surface of the turntable 635. The rotation of the turntable 635 thereby subjects the accelerometer 664 to centripetal acceleration $a_c$, which may be calculated as a square of an angular velocity of the accelerometer multiplied by a radius between a center of rotation and the rotating accelerometer, or $a_c=\omega^2 r$. An extent of the acceleration $a_{SENSED}$ sensed by the accelerometer 664 may be determined based on an orientation of the accelerometer 664, e.g., at an angle of sensitivity $\gamma$ with respect to direction of rotation or, alternatively, with respect to the center C.

In accordance with some embodiments of the present disclosure, actual inertial motion, namely, accelerations, may be imparted upon the accelerometer 664, e.g., by providing one or more control signals to the turntable 635 for causing the motor 632 to rotate at a constant, known angular velocity and for causing the accelerometer 664 to be oriented at a test angle of sensitivity $\gamma_{TEST}$, selected for subjecting the accelerometer 664 to a test acceleration $a_{TEST}$. The accelerometer 664 is also configured to report the acceleration $a_{SENSED}$ to the computer system 610 by one or more connectors extending through the slip ring 634, e.g., by providing one or more signals to the computer system 610 indicating the acceleration $a_{SENSED}$ sensed by the accelerometer 664. The computer system 610 may determine whether the test acceleration $a_{TEST}$ is consistent with the sensed acceleration $a_{SENSED}$, with respect to any degree of tolerance or confidence level, or according to any threshold. Those of ordinary skill in the pertinent arts will recognize that where the motor 632 is rotated at a constant angular velocity, different levels of acceleration may be imparted upon the accelerometer 664 easily by varying the angle of sensitivity $\gamma_{TEST}$ as the accelerometer 664 is rotated, thereby enabling the accelerometer and/or an inertial navigation system to be subjected to a diverse testing procedure or regimen relatively efficiently.

Figure 7A:
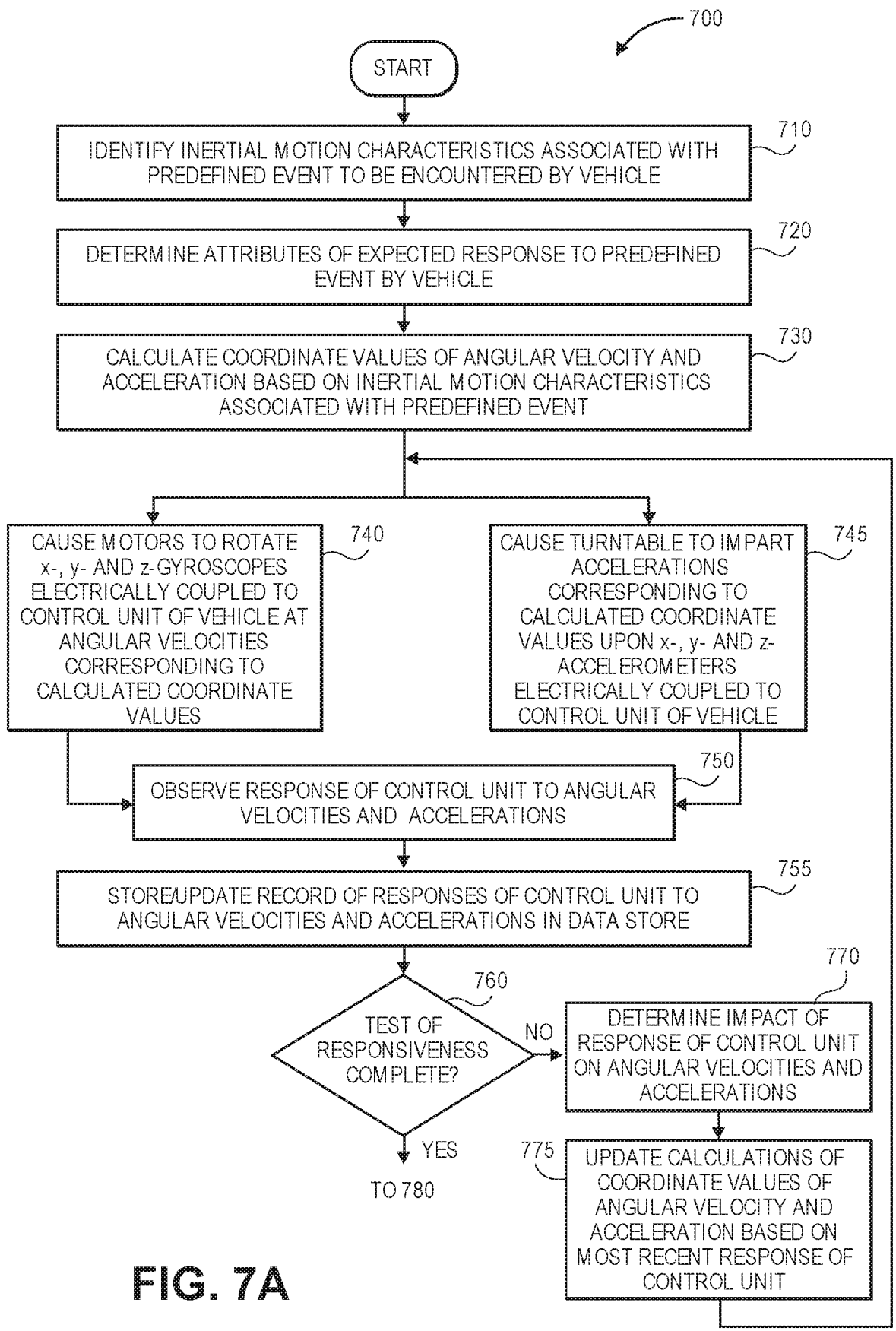
FIGS. 7A and 7B are a flow chart of one method for simulating inertial motion in accordance with embodiments of the present disclosure.
Figure 7B:
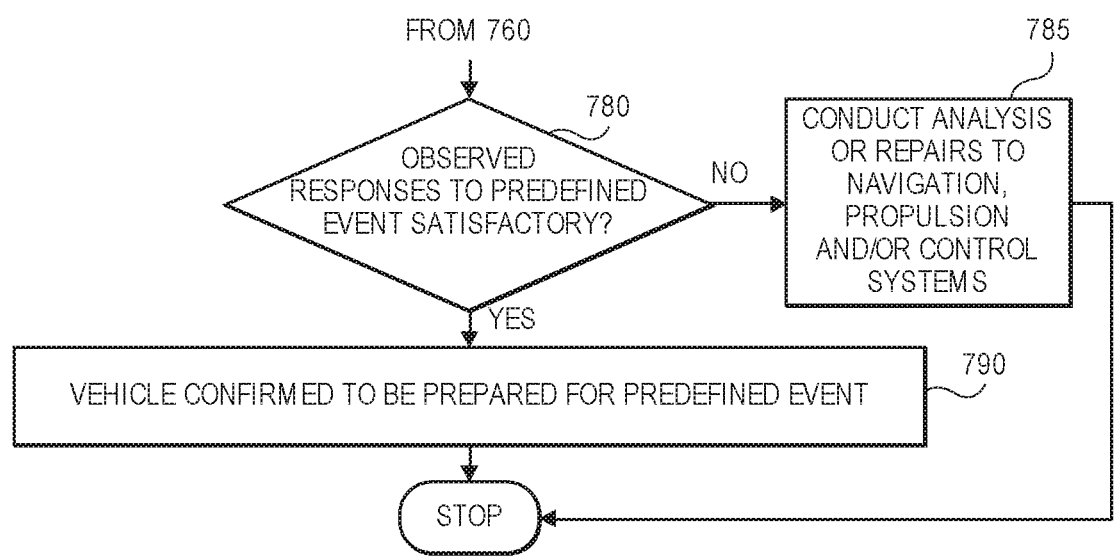

As is discussed above, when one or more gyroscopes and/or accelerometers are physically coupled to motors, turntables or other rotating equipment, and electronically coupled to an inertial navigation system (or inertial measurement unit), actual inertial motion may be imparted upon one or more of the gyroscopes and/or accelerometers by way of the motors, turntables or other rotating equipment, in order to simulate the operability and/or responsiveness of the inertial navigation system to one or more events. Referring to FIGS. 7A and 7B, a flow chart 700 of one method for simulating inertial motion in accordance with embodiments of the present disclosure is shown. At box 710, inertial motion characteristics associated with a predefined event that may be encountered by a vehicle are identified. In some embodiments, such characteristics may include values of one or more linear and/or angular velocities, linear and/or angular accelerations, or any other attributes or features. For example, where the predefined event is a wind gust, an impact with an object, or the receipt or discharge of an item via an item engagement system by an aerial vehicle, the inertial motion characteristics may include velocities and/or accelerations that the aerial vehicle is expected to encounter during such events. Where the predefined event is a braking evolution for a road vehicle, or a collision of the road vehicle, the inertial motion characteristics may include velocities and/or accelerations that the road vehicle is expected to encounter prior to or during such events. The characteristics may be identified based on prior occurrences of the events, e.g., for a specific vehicle, or for one vehicle of a class or fleet, or predicted based on the nature of such events.

At box 720, attributes of expected responses to the predefined event by the vehicle are determined. For example, where the predefined event is a wind gust, an impact with an object, or the receipt or discharge of an item via an item engagement system by an aerial vehicle, attributes of the expected responses may include desired rotating speeds and/or orientations of propulsion motors or desired deflections or other operations of control surfaces to be initiated by the control unit in response to the predefined event. Where the predefined event is the braking evolution for a road vehicle, or a collision of the road vehicle, attributes of the expected responses may include the desired activation of air bags or other supplemental restraint systems, or the desired transmission of distress signals, or any other actions that are to be initiated by the control unit in response to the predefined event.

At box 730, coordinate values of angular velocities and accelerations are determined based on the inertial motion characteristics determined at box 710. For example, values of the angular velocities or accelerations about principal axes of vehicle, or axes according to any other coordinate standard, e.g., a normal axis (or yaw axis), a lateral axis (or pitch axis), and a longitudinal axis (or roll axis) of the vehicle, may be determined according to one or more trigonometric relationships or equations.

At box 740, motors are caused to rotate x-, y- and z-gyroscopes that are electronically coupled to a control unit of the vehicle at angular velocities corresponding to the coordinate values. In parallel, at box 745, turntables that are electronically coupled to the control unit of the vehicle are caused to impart accelerations corresponding to the coordinate values onto x-, y- and z-accelerometers that are also electronically coupled to the control unit. For example, each of the x-, y- and z-accelerometers may be mechanically coupled to drive shafts of the motors and rotated at speeds corresponding to the coordinate values of the angular velocities respectively determined at box 730, such as is shown in FIGS. 1E and 1F, in order to simulate an overall angular velocity on the aerial vehicle that is consistent with the predefined event. Each of the accelerometers may be pivotably coupled to the turntables or other rotatable surfaces, at radii from centers of the turntables, and configured to be positioned in one or more orientations about an axis. The turntables may be rotated at speeds for generating sufficient levels of centripetal acceleration, and the accelerometers may be placed in selected orientations, to cause the accelerometers to sense selected levels of acceleration corresponding to the coordinate values of the accelerations respectively determined at box 730, such as is shown in FIGS. 1E and 1G, in order to simulate an overall acceleration on the aerial vehicle that is consistent with the predefined event.

At box 750, the response of the control unit to the angular velocities and the accelerations is observed. For example, in response to the angular velocities and accelerations, the control unit may initiate one or more actions, e.g., by transmitting one or more signals, messages or instructions to one or more other components of the vehicle, such as one or more propulsion motors, control surfaces or systems. At box 755, a record of the responses of the control unit to the angular velocities and accelerations is stored in one or more data stores. Such a record may indicate times at which the angular velocities and accelerations are sensed, times at which the control unit initiates one or more actions in response to the angular velocities and accelerations, any lag between the sensing of such angular velocities and accelerations and the initiation of such actions, and may include one or more values of such angular velocities and accelerations, and values associated with such actions, e.g., speeds (or changes in speed) of one or more propulsion motors, orientations or positions (or changes in such orientations or positions) of one or more control surfaces, or any other information or data.

At box 760, whether a test of the responsiveness of the vehicle to the predefined event is complete is determined. For example, where the test of the responsiveness is associated with a testing procedure or regimen, whether each of the steps or actions associated with the testing procedure or regimen (e.g., each of the predefined events of the testing procedure or regimen) has been conducted, or whether results of such steps or actions are satisfactory, may be determined. If the test of the responsiveness is not complete, then the process advances to box 770, where an impact of the response of the control unit on the angular velocities and accelerations associated with the predefined event is determined. For example, where a predefined event imparts an angular rotation and/or acceleration upon the aerial vehicle, and where the control unit causes one or more propulsion motors, control surfaces or other systems to operate in response to the angular rotation and/or acceleration, such as by issuing one or more instructions for operating one or more motors at selected speeds or deflecting, rotating, extending or otherwise operating one or more control surfaces, effects of such operations on the angular rotation and/or acceleration of the aerial vehicle may be determined either directly or by comparison to one or more attributes of an expected response.

At box 775, calculations of the coordinate values of angular velocity and acceleration are updated based on a most recent response of the control unit observed at box 750. For example, where an aerial vehicle is intended to be operated at a selected course, speed, altitude and/or orientation, and a predefined event would impart an angular velocity and/or acceleration upon the aerial vehicle, the effects of the response of the control unit to the angular velocities and/or accelerations observed at box 750, e.g., whether the aerial vehicle would actually remain on the selected course or at the selected speed or altitude, or in the selected orientation, may be determined. Alternatively, where a change in a course, a speed, an altitude and/or an orientation in response to a predefined event is desired, the effects of the response of the control unit to the angular velocities and/or accelerations observed at box 750, e.g., whether the aerial vehicle would effectuate the desired change in course, speed, altitude and/or orientation, may be determined. The process then returns to box 740, where the motors are caused to rotate x-, y- and z-gyroscopes at angular velocities corresponding to the coordinate values updated at box 775, and to box 745, where the turntables are caused to impart accelerations corresponding to the coordinate values updated at box 775.

If the test of the responsiveness of the vehicle to the predefined event is complete, however, then the process advances to box 780, where whether the observed responses to the predefined event are deemed satisfactory is determined. For example, whether the control unit properly sensed the angular velocities associated with the inertial motion characteristics, as respectively reported by the x-, y- and z-gyroscopes, as well as the accelerations associated with the inertial motion characteristics, as respectively reported by the x-, y- and z-accelerometers, may be determined based on responses to such angular velocities and accelerations initiated by the control unit, and whether such responses are consistent with desired responses to such angular velocities and accelerations. The consistency of the observed response to the actual response, or between any attributes of the observed response to any corresponding attributes of the expected response, may be determined with respect to any degree of tolerance or confidence level, or according to any threshold. If the observed responses are not deemed satisfactory, then the process advances to box 785, where analyses or repairs to the navigation, propulsion and/or control systems (e.g., the gyroscopes, accelerometers and/or control unit) are conducted, and the process ends. For example, conductivity checks, voltage checks, visual inspections, or any other evaluations of the gyroscopes, the accelerometers or the control unit, or any connectors, power supplies or other aspects of the vehicle may be performed. If the observed responses are deemed satisfactory, however, then the process advances to box 790, where the vehicle is confirmed to be prepared for the predefined event, and the process ends.

Figure 8A:
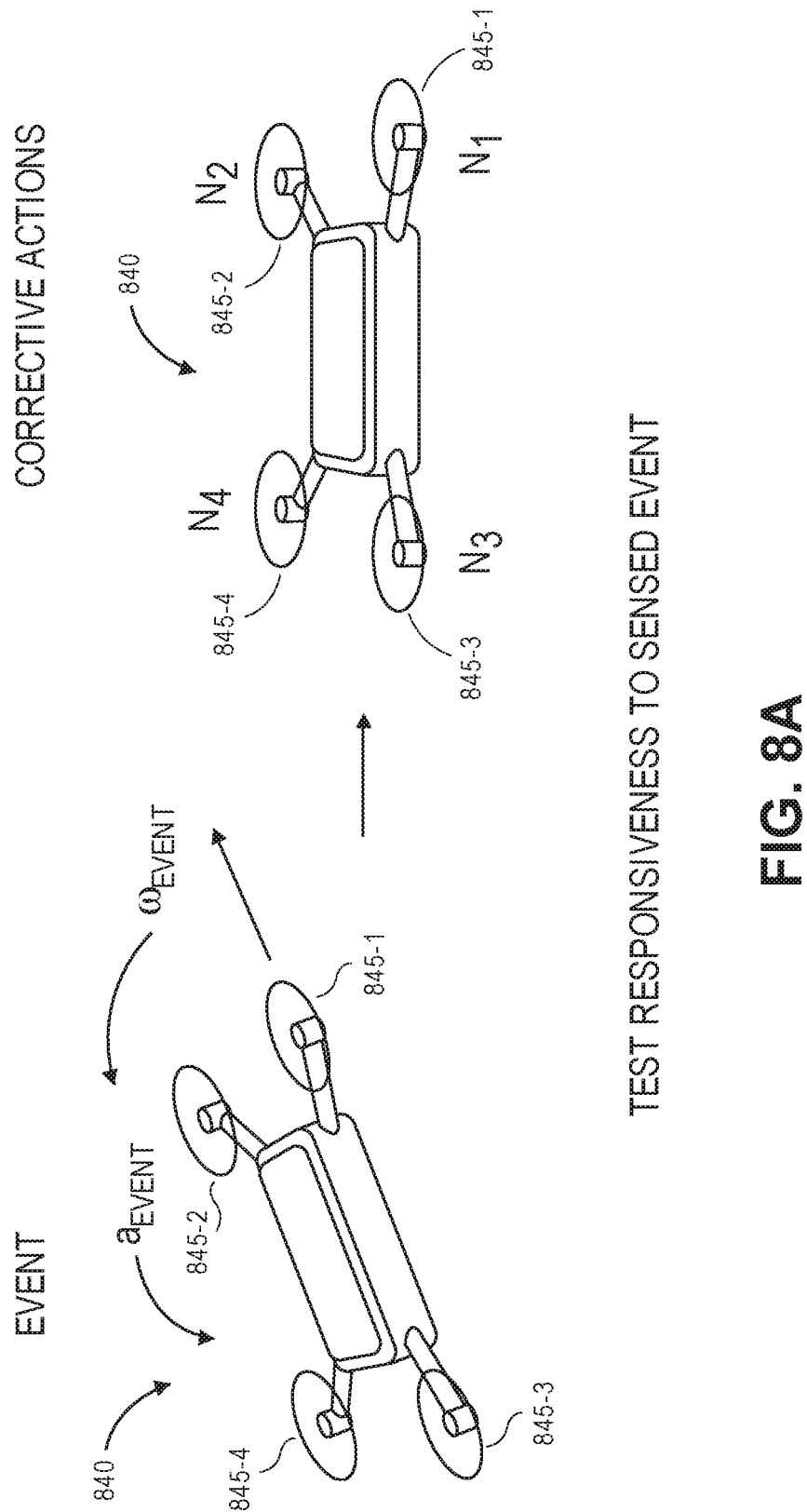
Figure 8C:
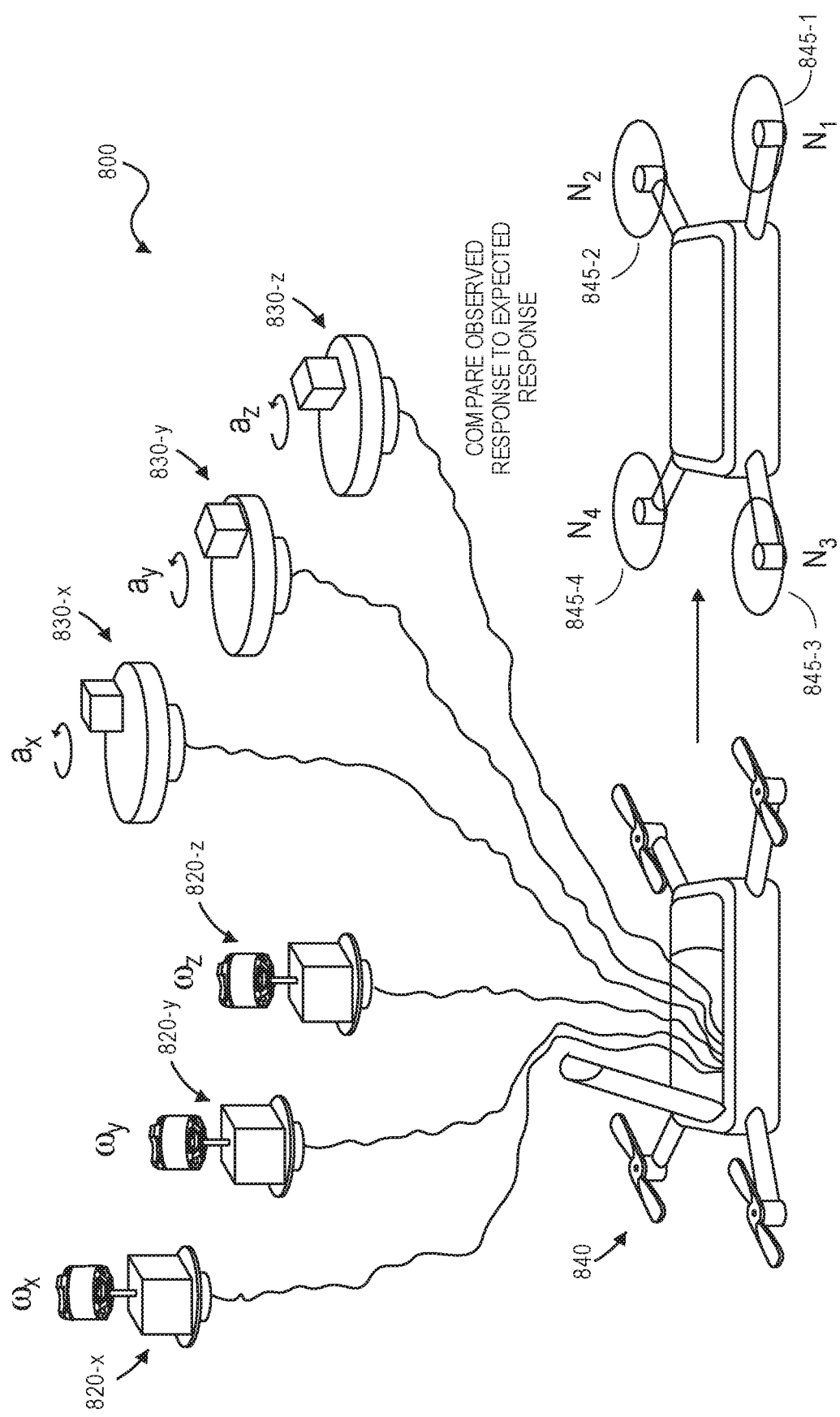

As is discussed above, in some embodiments, the systems and methods of the present disclosure may be operated to confirm the responsiveness of a vehicle having an onboard inertial navigation system to one or more events. Referring to FIGS. 8A through 8C, views of aspects of one system 800 for simulating inertial motion in accordance with embodiments of the present disclosure are shown. Except where otherwise noted, reference numerals preceded by the number "8" shown in FIG. 8A, FIG. 8B or FIG. 8C indicate components or features that are similar to components or features having reference numerals preceded by the number "6" shown in FIG. 6A or FIG. 6B, by the number "4" shown in FIG. 4, by the number "2" in FIG. 2 or by the number "1" shown in FIGS. 1A through 1H.

As is shown in FIG. 8A, an aerial vehicle 840 having four propulsion motors 845-1, 845-2, 845-3, 845-4 and an onboard inertial navigation system 860 may be programmed to respond to inertial motion associated with an event, including accelerations $a_{EVENT}$ and/or rotations at angular velocities $\omega_{EVENT}$. Upon sensing the accelerations $a_{EVENT}$ and/or the angular velocities $\omega_{EVENT}$, the inertial navigation system 860 may be programmed to provide one or more signals in response to the event to one or more of the propulsion motors 845-1, 845-2, 845-3, 845-4, e.g., for causing the propulsion motors 845-1, 845-2, 845-3, 845-4, to operate at selected power levels $N_1$, $N_2$, $N_3$, $N_4$, such as to maintain the aerial vehicle 840 in a specific orientation or on a desired course, at a desired speed, or at a desired altitude in spite of the event, or to effectuate a change in a course, a speed, an altitude or an orientation in response to the event. Alternatively, the internal navigation system 860 may be programmed to take any other action in response to the event, including but not limited to operating one or more control surfaces (not shown), transmitting one or more electronic messages, deploying or retrieving one or more payloads, or any other action.

Components of the accelerations $a_{EVENT}$ and/or the angular velocities $\omega_{EVENT}$ associated with the event may be calculated with respect to x-, y- and z-axes, e.g., according to one or more trigonometric relationships or equations. For example, as is shown in FIG. 8B, values $a_x$, $a_y$ and $a_z$ of the acceleration $a_{EVENT}$ and values $\omega_x$, $\omega_y$ and $\omega_z$ of the angular velocity $\omega_{EVENT}$ may be determined trigonometrically, e.g., based on right triangles defined according to one or more trigonometric relationships or equations.

Once the components of the accelerations $a_{EVENT}$ and/or the angular velocities $\omega_{EVENT}$ have been calculated with respect to the x-, y- and z-axes, the gyroscopes of the aerial vehicle 840 that are provided to sense angular velocities about such axes may be removed from the aerial vehicle 840 and installed in rotation testing units 820-*x*, 820-*y*, 820-*z*, while maintaining the angular velocities in communication with the inertial navigation system 860 of the aerial vehicle 840. Similarly, the accelerometers of the aerial vehicle 840 that are provided to sense accelerations about such axes may be removed from the aerial vehicle 840 and installed in acceleration testing units 830-*x*, 830-*y*, 830-*z*, while maintaining the accelerometers in communication with the inertial navigation system 860 of the aerial vehicle 840. The rotation testing units 820-*x*, 820-*y*, 820-*z* may then rotate, e.g., by one or more motors, the respective gyroscopes about the x-, y- and z-axes at the angular velocities $\omega_x$, $\omega_y$ and $\omega_z$ calculated as is shown in FIG. 8B. Likewise, the accelerometers may be pivotably mounted to rotatable surfaces of the acceleration testing units 830-*x*, 830-*y*, 830-*z*, and rotated at sufficient angular velocities, with the accelerometers oriented at specific angles of orientation, for causing the accelerometers to experience the accelerations $a_x$, $a_y$ and $a_z$ calculated as is shown in FIG. 8B.

Once the gyroscopes are rotating at the angular velocities $\omega_x$, $\omega_y$ and $\omega_z$, and the accelerometers are experiencing the accelerations $a_x$, $a_y$ and $a_z$, a response by the inertial navigation system 860 to the angular velocities $\omega_x$, $\omega_y$ and $\omega_z$, and/or the accelerations $a_x$, $a_y$ and $a_z$ may be observed and compared to a response to the event that is expected from the inertial navigation system 860. For example, where the inertial navigation system 860 is programmed to maintain the aerial vehicle 840 at selected roll, pitch and yaw angles, e.g., by adjusting the operating speeds of the propulsion motors 845-1, 845-2, 845-3, 845-4 to power levels $N_1$, $N_2$, $N_3$, $N_4$, the signals, messages or instructions generated by the inertial navigation system 860 may be evaluated to determine whether such signals, messages or instructions are consistent with the power levels $N_1$, $N_2$, $N_3$, $N_4$ in order to confirm whether the aerial vehicle 840 is adequately configured to respond to the event. If such signals, messages or instructions are not consistent with the power levels $N_1$, $N_2$, $N_3$, $N_4$, then the aerial vehicle 840 may be deemed unfit for flight, or otherwise unable to adequately respond to the event, and further inspections or maintenance may be required.

Furthermore, in some embodiments, the operation of the rotation testing units 820-*x*, 820-*y*, 820-*z* and the acceleration testing units 830-*x*, 830-*y*, 830-*z*, may be modified based on the response by the inertial navigation system 860 to the angular velocities $\omega_x$, $\omega_y$ and $\omega_z$, and the accelerations $a_x$, $a_y$ and $a_z$. For example, where the inertial navigation system 860 generates one or more signals, messages or instructions in response to sensing the angular velocities $\omega_x$, $\omega_y$ and $\omega_z$, and the accelerations $a_x$, $a_y$ and $a_z$, e.g., to change an operating speed of one or more of the propulsion motors 845-1, 845-2, 845-3, 845-4, to operate one or more control surfaces (not shown), or to take any other action, the effects of such actions on the aerial vehicle 840 in response to such actions may be determined, and the operation of the rotation testing units 820-*x*, 820-*y*, 820-*z* and the acceleration testing units 830-*x*, 830-*y*, 830-*z*, e.g., the operating speeds of motors and/or the orientations of the accelerometers, may be adjusted accordingly to reflect the change in the simulated conditions of the aerial vehicle 840. In this regard, the systems and methods of the present disclosure may be utilized to not only evaluate the responsiveness of an inertial navigation system of an aerial vehicle to an event but also to provide feedback to the inertial navigation system or the aerial vehicle as to the impact of a selected response. Testing procedures or regimens of extended durations, e.g., durations corresponding to a flight evolution of an aerial vehicle, may be conducted on the aerial vehicle, and may determine not only how the aerial vehicle responds to predetermined events imparting angular velocities or accelerations on the aerial vehicle but also whether such responses are effective in addressing the angular velocities or accelerations.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, one or more of the embodiments of the present disclosure may be utilized as a primary system or method for simulating effects of inertial motion on one or more bodies or, alternatively, in concert with other systems or methods, e.g., as a secondary or backup system or method, for simulating the effects of inertial motion on such bodies. Additionally, one or more of the embodiments of the present disclosure may be utilized to simulate the effects of inertial motion on any type or form of body, and are not limited to simulating such effects on unmanned aerial vehicles. For example, any body having one or more gyroscopes, accelerometers and/or other inertial motion sensors may be evaluated using one or more of the embodiments disclosed herein. Such bodies may include, but are not limited to, automobiles, motorcycles, boats, trains, or any other body, including but not limited to bodies having inertial navigation systems or bodies for which detecting angular velocities and/or accelerations is of critical importance.

Additionally, combinations, features or aspects of one or more of the embodiments discussed or described herein may be utilized in concert with any object having one or more inertial measurement units, inertial navigation systems, gyroscopes, accelerometers or other components. Although some of the embodiments disclosed herein may reference the simulation of inertial motion of unmanned aerial vehicles, e.g., for delivering payloads from warehouses or other like facilities to customers or other recipients, those of ordinary skill in the pertinent arts will recognize that the systems and methods disclosed herein are not so limited, and may be utilized to simulate inertial motion on any type or form of device, system, vehicle, station or other object in general, including any type or form of aerial vehicle (e.g., manned or unmanned) having fixed or rotating wings for any intended industrial, commercial, recreational or other use, as well as any other type or form of land-based, sea-based or air-based vehicle, station or object.

It should be understood that, unless otherwise explicitly or implicitly indicated herein, any of the features, capacities, attributes, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIG. 3, 5 or 7A and 7B, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A method comprising:
   identifying a first attribute of inertial motion, wherein the inertial motion comprises at least one of angular rotation or acceleration;
   selecting a first angular velocity based at least in part on the first attribute of the inertial motion;
   causing an inertial motion sensor to rotate at the first angular velocity by at least a first motor;
   receiving at least a first signal from the inertial motion sensor by an inertial navigation system, wherein at least the first signal indicates at least a second attribute of the inertial motion sensed by the inertial motion sensor, wherein the inertial navigation system is associated with a vehicle, and wherein the first motor is not mechanically coupled to the vehicle; and
   in response to receiving at least the first signal,
      determining, based at least in part on the first attribute and the second attribute, whether at least one of the inertial motion sensor or the inertial navigation system is properly functioning.

2. The method of claim 1, wherein the inertial motion sensor is a first gyroscope,
   wherein the first attribute is the first angular velocity,
   wherein the method further comprises:
      mechanically coupling the first gyroscope to a first drive shaft of the first motor, and
   wherein causing the inertial motion sensor to rotate at the first angular velocity comprises:
      causing the first motor to rotate the first drive shaft at the first angular velocity.

3. The method of claim 2, wherein the second attribute is a second angular velocity sensed by the first gyroscope, and
   wherein determining whether the at least one of the inertial motion sensor or the inertial navigation system is properly functioning comprises:
      determining whether the second angular velocity is within a predetermined threshold of the first angular velocity.

4. The method of claim 1, wherein the first motor is a brushless DC motor, and
   wherein the first signal is received by way of at least one connector extending between the inertial motion sensor and the inertial navigation system by way of a slip ring.

5. The method of claim 1, wherein the inertial motion sensor is a first accelerometer,
   wherein the first attribute of the inertial motion is a first acceleration,
   and
   wherein causing the inertial motion sensor to rotate at the first angular velocity by at least the first motor comprises:
      pivotably coupling the first accelerometer to a first turntable, wherein the first turntable is mechanically coupled to a first drive shaft of the first motor, wherein the first accelerometer is pivotably coupled to the first turntable at a radius from a center of the first turntable, and wherein the first accelerometer is configured to be oriented in one of a plurality of orientations about an axis of rotation at the distance from the center, and
   wherein selecting the first angular velocity further comprises:
      selecting a first orientation of the first accelerometer based at least in part on the first acceleration and the first angular velocity;
      positioning the first accelerometer in the first orientation about the axis of rotation; and
      causing the first motor to rotate the first drive shaft at the first angular velocity.

6. The method of claim 5, wherein the second attribute is a second acceleration sensed by the first accelerometer, and wherein determining whether the at least one of the inertial motion sensor or the inertial navigation system is properly functioning further comprises:
    determining whether the second acceleration is within a predetermined threshold of the first acceleration.

7. The method of claim 1, wherein selecting the first angular velocity and the first orientation comprises:
    selecting the first angular velocity of the first accelerometer;
    calculating a centripetal acceleration based in part on the radius and the first angular velocity; and
    selecting the first orientation of the first accelerometer based at least in part on a ratio of the first acceleration to the centrifugal acceleration according to at least one trigonometric function.

8. The method of claim 7, wherein pivotably coupling the first accelerometer to the first turntable further comprises:
    pivotably coupling the first accelerometer to a second drive shaft of a second motor embedded within the first turntable, wherein the axis of rotation is defined by the second drive shaft, and
    wherein positioning the first accelerometer in the first orientation about the axis of rotation further comprises:
    operating the second motor to place the first accelerometer in the first orientation about the axis of rotation.

9. The method of claim 1, wherein the first attribute of the inertial motion is a simulated angular velocity of the vehicle, wherein the inertial motion sensor is a first gyroscope,
    wherein selecting the first angular velocity comprises:
        selecting the first angular velocity, a second angular velocity and a third angular velocity based at least in part on the simulated angular velocity of the vehicle, wherein the first angular velocity is associated with a first principal axis of the vehicle, wherein the second angular velocity is associated with a second principal axis of the vehicle, and wherein the third angular velocity is associated with a third principal axis of the vehicle, and wherein the simulated angular velocity of the vehicle is a vector sum of the first angular velocity, the second angular velocity and the third angular velocity,
    wherein causing the inertial motion sensor to rotate at the first angular velocity comprises:
        causing the first gyroscope to rotate at the first angular velocity by at least the first motor;
        causing a second gyroscope to rotate at the second angular velocity by at least a second motor, wherein the second motor is not mechanically coupled to the vehicle; and
        causing a third gyroscope to rotate at the third angular velocity by at least a third motor, wherein the third motor is not mechanically coupled to the vehicle, and
    wherein receiving at least the first signal comprises:
        receiving at least the first signal from the first gyroscope by the inertial navigation system, wherein the second attribute is a fourth angular velocity sensed by the first gyroscope;
        receiving at least a second signal from the second gyroscope by the inertial navigation system, wherein the second signal indicates at least a fifth angular velocity sensed by the second gyroscope; and
        receiving at least a third signal from the third gyroscope by the inertial navigation system, wherein the third signal indicates at least a sixth angular velocity sensed by the third gyroscope.

10. The method of claim 9, wherein determining whether the at least one of the inertial motion sensor or the inertial navigation system is properly functioning based at least in part on the first signal comprises:
    identifying at least a fourth signal generated by the inertial navigation system in response to receiving at least one of the first signal, the second signal or the third signal, wherein the fourth signal comprises an instruction to execute at least one action by the vehicle; and
    determining whether the at least one of the inertial motion sensor or the inertial navigation system is properly functioning based at least in part on the fourth signal.

11. The method of claim 1, wherein the first attribute of the inertial motion is a simulated acceleration of the vehicle, wherein the inertial motion sensor is a first accelerometer,
    wherein selecting the first angular velocity comprises:
        identifying a first acceleration associated with a first principal axis of the vehicle, a second acceleration associated with a second principal axis of the vehicle and a third acceleration associated with a third principal axis of the vehicle, wherein a vector sum of the first acceleration, the second acceleration and the third acceleration is the simulated acceleration of the vehicle;
        selecting a first orientation of the first accelerometer based at least in part on the first acceleration and the first angular velocity;
        selecting a second orientation of the second accelerometer based at least in part on the second acceleration and a second angular velocity; and
        selecting a third orientation of the third accelerometer based at least in part on the third acceleration and a third angular velocity,
    wherein causing the inertial motion sensor to rotate at the first angular velocity comprises:
        causing the first accelerometer to be aligned in the first orientation;
        causing the second accelerometer to be aligned in the second orientation;
        causing the third accelerometer to be aligned in the third orientation;
        causing the first accelerometer to rotate at the first angular velocity by the first motor;
        causing the second accelerometer to rotate at the second angular velocity by a second motor, wherein the second motor is not mechanically coupled to the vehicle; and
        causing the third accelerometer to rotate at the third angular velocity by a third motor, wherein the third motor is not mechanically coupled to the vehicle, and
    wherein receiving at least the first signal comprises:
        receiving at least the first signal from the first accelerometer by the inertial navigation system, wherein the first signal indicates a fourth acceleration sensed by the first accelerometer;
        receiving at least a second signal from the second accelerometer by the inertial navigation system, wherein the second signal indicates a fifth acceleration sensed by the second accelerometer; and
        receiving at least a third signal from the third accelerometer by the inertial navigation system, wherein the third signal indicates a sixth acceleration sensed by the third accelerometer.

12. The method of claim 11, wherein determining whether the at least one of the inertial motion sensor or the inertial navigation system is properly functioning based at least in part on the first signal comprises:
   identifying at least a fourth signal generated by the inertial navigation system in response to receiving at least one of the first signal, the second signal or the third signal, wherein the fourth signal comprises an instruction to execute at least one action by the vehicle; and
   determining whether the at least one of the inertial motion sensor or the inertial navigation system is properly functioning based at least in part on the fourth signal.

13. The method of claim 1, further comprising:
   determining an anticipated response to the inertial motion by the inertial navigation system based at least in part on the first attribute, wherein the anticipated response comprises at least one of:
      causing an operation of at least one control surface of the vehicle by a predetermined extent; or
      causing an operation of at least one propulsion motor of the vehicle at one of a selected speed or a selected power level; and
   determining an observed response to the inertial motion by the inertial navigation system based at least in part on the second attribute,
   wherein determining whether the at least one of the inertial motion sensor or the inertial navigation system is properly functioning comprises:
   comparing the anticipated response to the observed response.

14. The method of claim 1, further comprising:
   prior to causing the inertial motion sensor to rotate at the first angular velocity,
      removing the inertial motion sensor from the vehicle; and
      mechanically coupling the inertial motion sensor to at least the first motor,
   wherein the inertial motion sensor is caused to rotate at the first angular velocity after removing the inertial motion sensor from the vehicle and mechanically coupling the inertial motion sensor to at least the first motor.

15. A system for testing an inertial navigation system of a vehicle, wherein the system comprises:
   a motor configured to rotate a drive shaft about a first axis at an angular velocity selected based at least in part on a first attribute of inertial motion, wherein the inertial motion comprises at least one of angular rotation or acceleration, and wherein the motor is not a component of the vehicle;
   a turntable mechanically coupled to a distal end of the drive shaft, wherein the turntable comprises a planar surface;
   an inertial motion sensor pivotably coupled to the planar surface of the turntable at a radius from the first axis, wherein the inertial motion sensor is in communication with the inertial navigation system of the vehicle, wherein the inertial motion sensor is configured to be positioned in one or more of a plurality of orientations about a second axis, wherein the second axis is substantially perpendicular to the planar surface and substantially parallel to the first axis, and wherein rotating the drive shaft at the angular velocity causes the inertial motion sensor to rotate at the angular velocity; and
   a control system having at least one computer processor, wherein the control system is in communication with the motor.

16. The system of claim 15, wherein the at least one computer processor of the control system is configured to at least:
   select the angular velocity based at least in part on the first attribute of inertial motion; and
   cause the motor to rotate the drive shaft at the selected velocity, and
   wherein the inertial navigation system comprises at least one computer processor configured to at least:
   receive at least a first signal from the inertial motion sensor;
   determine, based at least in part on the first signal, a second attribute of the inertial motion sensed by the accelerometer; and
   determine, based at least in part on the first attribute and the second attribute, whether at least one of the inertial motion sensor or the inertial navigation system is properly functioning.

17. The system of claim 15, wherein the at least one computer processor of the inertial navigation system is further configured to at least:
   generate a second signal in response to the first signal, wherein the second signal comprises an instruction to execute at least one action by the vehicle, and
   wherein whether the at least one of the inertial motion sensor is properly functioning is determined based at least in part on the second signal.

18. A method comprising:
   removing an inertial motion sensor from a vehicle, wherein the inertial motion sensor remains in communication with an inertial navigation system of the vehicle after being removed from the vehicle;
   coupling the inertial motion sensor to a turntable, wherein the turntable is coupled to a drive shaft of a motor, wherein the turntable is configured to rotate about a first axis defined by the drive shaft of the motor, wherein the inertial motion sensor is configured for repositioning about a second axis parallel to the first axis, wherein the inertial motion sensor remains in communication with the inertial navigation system after being coupled to the turntable;
   identifying a first attribute of inertial motion, wherein the inertial motion comprises at least one of angular rotation or acceleration;
   selecting an angular velocity based at least in part on the first attribute of the inertial motion;
   causing the turntable to rotate at the angular velocity by the motor, wherein the motor is not a component of the vehicle;
   receiving at least a first signal from the inertial motion sensor by the inertial navigation system, wherein at least the first signal indicates at least a second attribute of the inertial motion sensed by the inertial motion sensor; and
   in response to receiving at least the first signal,
      determining, based at least in part on the first attribute and the second attribute, whether at least one of the inertial motion sensor or the inertial navigation system is properly functioning.

19. The method of claim 18, wherein the first attribute is a first acceleration,
   wherein the second attribute is a second acceleration sensed by the inertial motion sensor, and
   wherein determining whether the at least one of the inertial motion sensor or the inertial navigation system is properly functioning comprises:

determining whether the second acceleration is within a predetermined threshold of the first acceleration.

20. The method of claim 18, further comprising:

generating a second signal in response to the first signal, wherein the second signal comprises an instruction to execute at least one action by the vehicle, and wherein whether the at least one of the inertial motion sensor is properly functioning is determined based at least in part on the second signal.

* * * * *